United States Patent
Takano et al.

(10) Patent No.: US 10,547,182 B2
(45) Date of Patent: Jan. 28, 2020

(54) ELECTRIC OPERATING MACHINE

(71) Applicant: HITACHI KOKI CO., LTD., Tokyo (JP)

(72) Inventors: Nobuhiro Takano, Ibaraki (JP); Kazuhiko Funabashi, Ibaraki (JP); Hideyuki Tanimoto, Ibaraki (JP); Chikai Yoshimizu, Ibaraki (JP); Hiromi Ozawa, Ibaraki (JP); Yoshihiro Hoshi, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 15/429,787

(22) Filed: Feb. 10, 2017

(65) Prior Publication Data

US 2017/0155258 A1   Jun. 1, 2017

Related U.S. Application Data

(62) Division of application No. 13/389,574, filed as application No. PCT/JP2010/005311 on Aug. 27, 2010, now abandoned.

(30) Foreign Application Priority Data

Aug. 28, 2009  (JP) ................................. 2009-199066
Sep. 30, 2009  (JP) ................................. 2009-229092
Jan. 14, 2010  (JP) ................................. 2010-006186

(51) Int. Cl.
  *H02J 7/00*    (2006.01)
  *A01D 69/02*   (2006.01)
  (Continued)

(52) U.S. Cl.
  CPC ............ *H02J 7/0026* (2013.01); *A01D 69/02* (2013.01); *H01M 10/0525* (2013.01);
  (Continued)

(58) Field of Classification Search
  CPC ......... H01M 10/0525; H01M 10/4221; H01M 10/425; H01M 10/48; H02K 7/145; H02P 29/027; H02J 7/0026; A01D 69/02
  (Continued)

(56) References Cited

U.S. PATENT DOCUMENTS 4,093,882 A   6/1978  Furuta
4,462,080 A   7/1984  Johnstone et al.
(Continued)

FOREIGN PATENT DOCUMENTS

CN   1081545 A   2/1994
JP   48-4734 Y   2/1973
(Continued)

OTHER PUBLICATIONS

Notification of Third Office Action Chinese Patent Application No. 201080012780.1 dated Apr. 28, 2015 with full English translation.
(Continued)

*Primary Examiner* — Jorge L Carrasquillo
(74) *Attorney, Agent, or Firm* — McDermott Will & Emery LLP

(57) ABSTRACT

When a main switch (12) is turned ON, an electric operating machine (1) is put in the standby mode. With a trigger (13) being pulled in the standby mode, a power supply circuit (16) applies a voltage to a drive part (30). The power supply circuit (16) adjusts the voltage applied to the drive part (30) for a voltage corresponding to the pulling rate of the trigger (13). When the current running toward the drive part (30) exceeds the rated value of the drive part (30), the power supply circuit (16) automatically stops power supply to the drive part (30). On the other hand, when the output voltage of a battery (50) drops and the battery (50) is put in an overdischarge state, power supply to the drive part (30) is automatically stopped. When it is detected that the battery (Continued)

(50) undergoes an abnormal event, power supply to the drive part (30) is automatically stopped.

13 Claims, 17 Drawing Sheets

(51) Int. Cl.
- *H01M 10/0525* (2010.01)
- *H01M 10/42* (2006.01)
- *H01M 10/48* (2006.01)
- *H02K 7/14* (2006.01)
- *H02P 29/024* (2016.01)

(52) U.S. Cl.
CPC ..... *H01M 10/425* (2013.01); *H01M 10/4221* (2013.01); *H01M 10/48* (2013.01); *H02K 7/145* (2013.01); *H02P 29/027* (2013.01)

(58) Field of Classification Search
USPC .......................................... 318/139, 500, 504
See application file for complete search history.

(56) References Cited

U.S. PATENT DOCUMENTS

| | | | |
|---|---|---|---|
| 4,476,409 A | 10/1984 | Fukami | |
| 4,698,542 A | 10/1987 | Muller | |
| 5,181,369 A | 1/1993 | Everts | |
| 5,444,359 A | 8/1995 | Riggio | |
| 5,675,236 A * | 10/1997 | Nakanishi | G01R 31/3842 320/136 |
| 6,124,698 A * | 9/2000 | Sakakibara | H02J 7/008 320/110 |
| 7,752,760 B2 | 7/2010 | Baskar et al. | |
| 8,009,054 B2 * | 8/2011 | Reams | G08C 17/02 340/636.15 |
| 2003/0173940 A1 | 9/2003 | Kovarik et al. | |
| 2005/0057217 A1 * | 3/2005 | Fujimoto | H02J 7/0008 320/106 |
| 2005/0073282 A1 * | 4/2005 | Carrier | B25F 5/00 320/106 |
| 2007/0059186 A1 | 3/2007 | Weaver et al. | |
| 2008/0106159 A1 | 5/2008 | Yoshida et al. | |
| 2008/0272760 A1 | 11/2008 | Wiesner et al. | |
| 2009/0033277 A1 * | 2/2009 | Ludtke | H02J 7/0004 320/106 |
| 2009/0039725 A1 | 2/2009 | Kanatani et al. | |
| 2009/0284022 A1 * | 11/2009 | Usselman | F02D 29/06 290/38 R |
| 2012/0071043 A1 * | 3/2012 | Rembach | B63H 21/21 440/6 |

FOREIGN PATENT DOCUMENTS

| | | |
|---|---|---|
| JP | 02-097246 | 4/1990 |
| JP | 6-31423 U | 4/1994 |
| JP | 10-502540 A | 3/1998 |
| JP | 10-178867 A | 7/1998 |
| JP | 2003526531 A | 9/2003 |
| JP | 3105673 U | 11/2004 |
| JP | 2006-217843 A | 8/2006 |
| JP | 2008-000067 A | 1/2008 |
| JP | 2008000067 A | 1/2008 |
| JP | 2008-178278 A | 7/2008 |

OTHER PUBLICATIONS

European Office Action issued in European Application No. 10754599.8-1809 dated Jun. 26, 2014.
Japanese Office Action issued in Japanese Application No. 2010-006186 dated Jun. 3, 2014, w/English translation.
Non-Final Office Action issued in U.S. Appl. No. 13/389,574 dated Aug. 28, 2014.
Final Office Action issued in U.S. Appl. No. 13/389,574 dated Apr. 23, 2015.
Non-Final Office Action issued in U.S. Appl. No. 13/389,574 dated Nov. 20, 2015.
Final Office Action issued in U.S. Appl. No. 13/389,574 dated Aug. 10, 2016.

\* cited by examiner

ELECTRIC OPERATING MACHINE

CROSS REFERENCE TO RELATED APPLICATIONS

This application is a Divisional of U.S. patent application Ser. No. 13/389,574, filed on Feb. 8, 2012, which is the U.S. National Phase under 35 U.S.C. § 371 of International Application No. PCT/JP2010/005311, filed on Aug. 27, 2010, which in turn claims the benefit of Japanese Application No. 2009-199066, filed on Aug. 28, 2009, Japanese Application No. 2009-229092, filed on Sep. 30, 2009 and Japanese Application No. 2010-006186 filed on Jan. 14, 2010, the disclosures of which Applications are incorporated by reference herein.

TECHNICAL FIELD

The present invention relates to an electric operating machine driven by a motor.

BACKGROUND ART

Recently, electric operating machines having a motor that drives a rotary blade (for example, electric lawn mowers) attract attention and are increasingly used. Using electric power as power source, electric operating machines (lawn mowers) are quiet, discharge no exhaust gas, and excellent in running cost.

For example, Patent Literature 1 discloses an electric lawn mower having adjustable motor rotation speed. This electric lawn mower has a converter to change the voltage applied to the motor so as to change the motor rotation speed. Then, the blade rotation speed can be changed according to the lawn grass to mow or the lawn shape. Electric driving produces low driving noise.

CITATION LIST

Patent Literature

[PTL 1]
Unexamined Japanese Patent Application KOKAI Publication No. 2006-217843.

SUMMARY OF INVENTION

Technical Problem

The electric lawn mower described in the Patent Literature 1 changes the rotation speed according to the battery output. Therefore, when a battery of different output is mounted, the motor does not rotate at a desired rotation speed, which is inconvenient. Furthermore, batteries have different weights depending on their output. When a battery of different output is mounted, the weight balance of the electric lawn mower is changed, which may lower the operability.

The present invention is made in view of the above problems and a purpose of the present invention is to provide an electric operating machine that can control the rotation speed of the motor regardless of the output of the battery mounted and allow for mounting/dismounting of batteries of different outputs. Furthermore, another purpose of the present invention is to provide an electric operating machine that is lightweight and well-balanced and therefore excellent in operability.

Solution to Problem

In order to achieve the above purpose, the electric operating machine according to the first aspect of the present invention is:
an electric operating machine comprising:
a power source part including a battery mounting part for mounting a battery;
and a voltage conversion part converting and outputting the voltage input from the battery; and
an electric motor to which a work tool rotating in association therewith is connected and that rotates upon application of the voltage output from the voltage conversion part,
characterized in that
the power source part further includes a voltage measuring part measuring the voltage applied to the electric motor and outputting it to the voltage conversion part is further provided; and
the voltage conversion part adjusts the output voltage so that the voltage output from the voltage measuring part has a given level.

For example, a battery of any voltage is mounted on or dismounted from the battery mounting part.

The power source part of the electric operating machine may further comprise an overcurrent protection part blocking the current running toward the electric motor when the current running toward the electric motor exceeds a given value.

Furthermore, the electric operating machine may further comprise a first announcing part announcing that an overcurrent is running when the current running toward the electric motor exceeds a given value.

The power source part of the electric operating machine may further comprise an overdischarge protection part blocking the current running toward the electric motor when the voltage output from the battery becomes lower than a predetermined voltage.

Furthermore, the electric operating machine may further comprise a second announcing part announcing that the battery is overly discharging when the voltage output from the battery becomes lower than a predetermined voltage.

Furthermore, the power source part of the electric operating machine may further comprise a voltage determination part determining the predetermined voltage based on battery information of the battery that is output from the battery.

Furthermore, the power source part of the electric operating machine may further comprise a battery abnormality stop part blocking the current running toward the electric motor according to battery abnormality signals output from the battery when the battery undergoes an abnormal event.

Furthermore, the battery abnormality stop part may block the current running toward the electric motor until the battery is dismounted from the battery mounting part since it receives the battery abnormality signals.

Furthermore, the electric operating machine may further comprise a third announcing part announcing that the battery undergoes an abnormal event when the battery undergoes an abnormal event.

Furthermore, it is possible that:
the electric operating machine further comprises a trigger, and
the voltage measuring part applies to the voltage conversion part a voltage according to the pulling rate of the trigger.

Furthermore, the power source part of the electric operating machine may further comprise a trigger switch part blocking the current running toward the electric motor when the pulling rate of the trigger is lower than a given rate and allowing a current to run through the electric motor when the pulling rate of the trigger is equal to or higher than the given rate.

The power source part of the electric operating machine may further comprise a main switch part blocking the current running from the battery to the trigger switch part when it is turned OFF and allowing the current when it is turned ON.

Furthermore, for example, the electric operating machine may further comprise a first light emitting part emitting light when the main switch part is ON.

Furthermore, the electric operating machine may further comprise a remaining battery level display displaying the remaining battery level according the voltage output from the battery.

Furthermore, the power source part of the electric operating machine may comprise a constant voltage circuit outputting a constant voltage from the voltage output from the battery.

Furthermore, the electric operating machine may further comprise a sound reproducing part operating upon application of a voltage output from the constant voltage circuit, decoding sound data, and reproducing sound information.

Furthermore, the electric operating machine may further comprise a radio operating upon application of a voltage output from the constant voltage circuit and detecting sound information in radio waves received by an antenna.

Furthermore, the electric operating machine may comprise a speaker amplifying the sound information and making sound by a voltage output from the constant voltage circuit.

Furthermore, it is preferable that the electric motor is a coreless motor.

Furthermore, the electric operating machine may further comprise a coupling part on whose one end the power source part is arranged and on whose other end the electric motor is arranged.

Furthermore, the electric operating machine may comprise a second light emitting part emitting light when the electric motor is powered.

Furthermore, the electric operating machine may further comprise a fourth announcing part announcing the power supply when the electric motor is powered.

Furthermore, it is possible that:
the coreless motor includes a rotor and a stator;
the rotor includes a fixed output shaft;
one of the rotor and stator comprises a disc-shaped coil substrate including multiple nearly annular coils arranged in the circumferential direction around the output shaft when seen in the axial direction of the output shaft; and
the other of the rotor and stator comprises a magnet generating a magnetic flux passing through the coil substrate in the axial direction of the output shaft.

Furthermore, in order to achieve the above purpose, the electric operating machine according to the second aspect of the present invention is:
an electric operating machine comprising:
a coreless motor;
a power source part comprising a mounting part to which a lithium rechargeable battery is detachably mounted; and
a coupling part holding the coreless motor at one end and holding the power source part at the other end, characterized in that:
the coreless motor includes a rotor and a stator;
the rotor includes a fixed output shaft;
one of the rotor and stator comprises a disc-shaped coil substrate including multiple nearly annular coils arranged in the circumferential direction around the output shaft when seen in the axial direction of the output shaft; and
the other of the rotor and stator comprises a magnet generating a magnetic flux passing through the coil substrate in the axial direction of the output shaft.

Furthermore, in order to achieve the above purpose, the electric operating machine according to the third aspect of the present invention is:
an electric operating machine comprising:
a coreless motor;
a power source part comprising a mounting part to which a rechargeable battery is detachably mounted;
a coupling part holding the coreless motor at one end and holding the power source part at the other end;
a grip part extending in the longitudinal direction of the coupling part, including a trigger operable by the operator for controlling the drive of the coreless motor, and being continued from or close to the power source part; and
a handle provided on the coupling part at a distance from the power source part and grip part for being held by the operator, characterized in that:
the coreless motor includes a rotor and a stator;
the rotor includes a fixed output shaft;
one of the rotor and stator comprises a disc-shaped coil substrate including multiple nearly annular coils arranged in the circumferential direction around the output shaft when seen in the axial direction of the output shaft;
the other of the rotor and stator comprises a magnet generating a magnetic flux passing through the coil substrate in the axial direction of the output shaft; and
the coreless motor is heavier than the rechargeable battery mounted on the mounting part and the gravity center of the electric operating machine is located on the coreless motor side with respect to the handle.

Furthermore, the coreless motor may comprise an aluminum alloy motor case housing the rotor.

Advantageous Effects of Invention

The electric operating machine according to the first aspect of the present invention can control the rotation speed of the motor regardless of the battery output and allow for mounting/dismounting of batteries of different outputs. Furthermore, the electric operating machines according to the second and third aspects of the present invention are lightweight and well-balanced and therefore excellent in operability.

Figure 4:
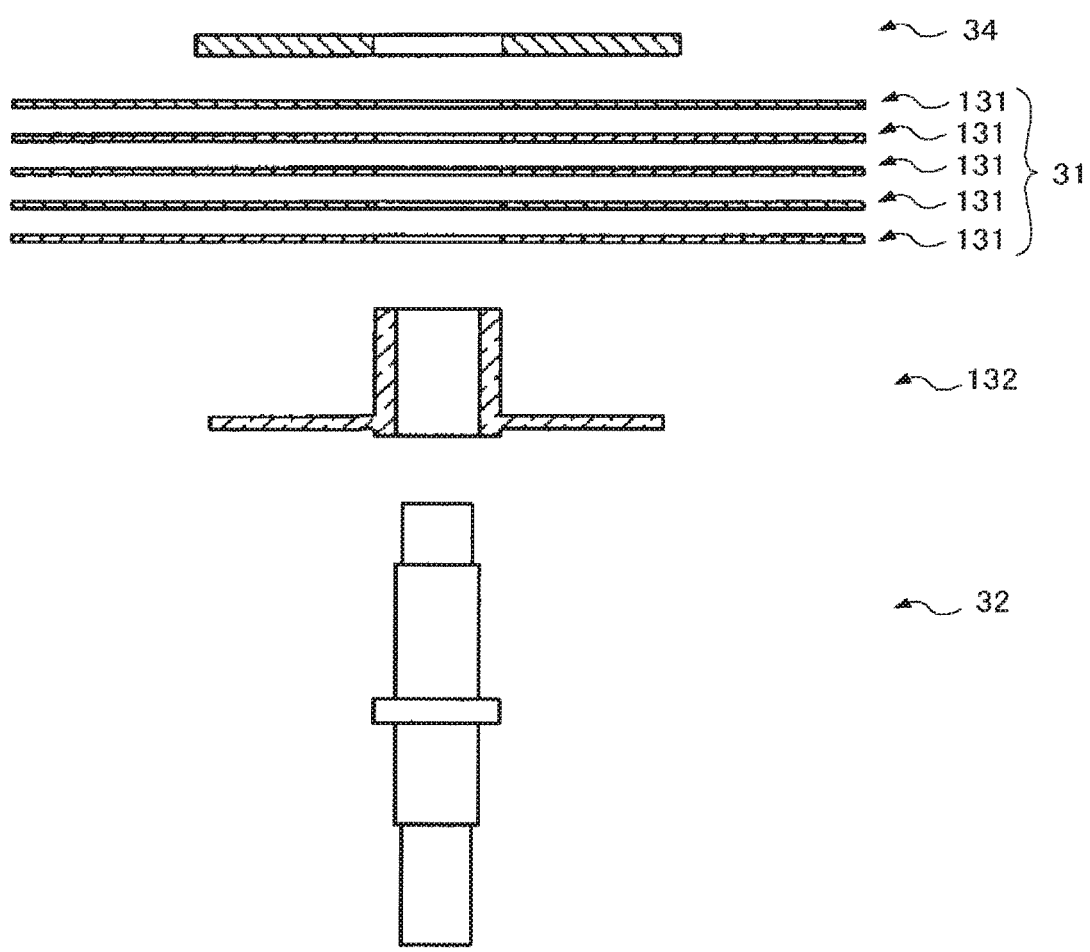
[FIG. 4]
An exploded cross-sectional view of the rotor of the electric operating machine in FIG. 1.

A top view of the coil substrate part of the rotor in FIG. 4;

[FIG. 7]

Figure 1:
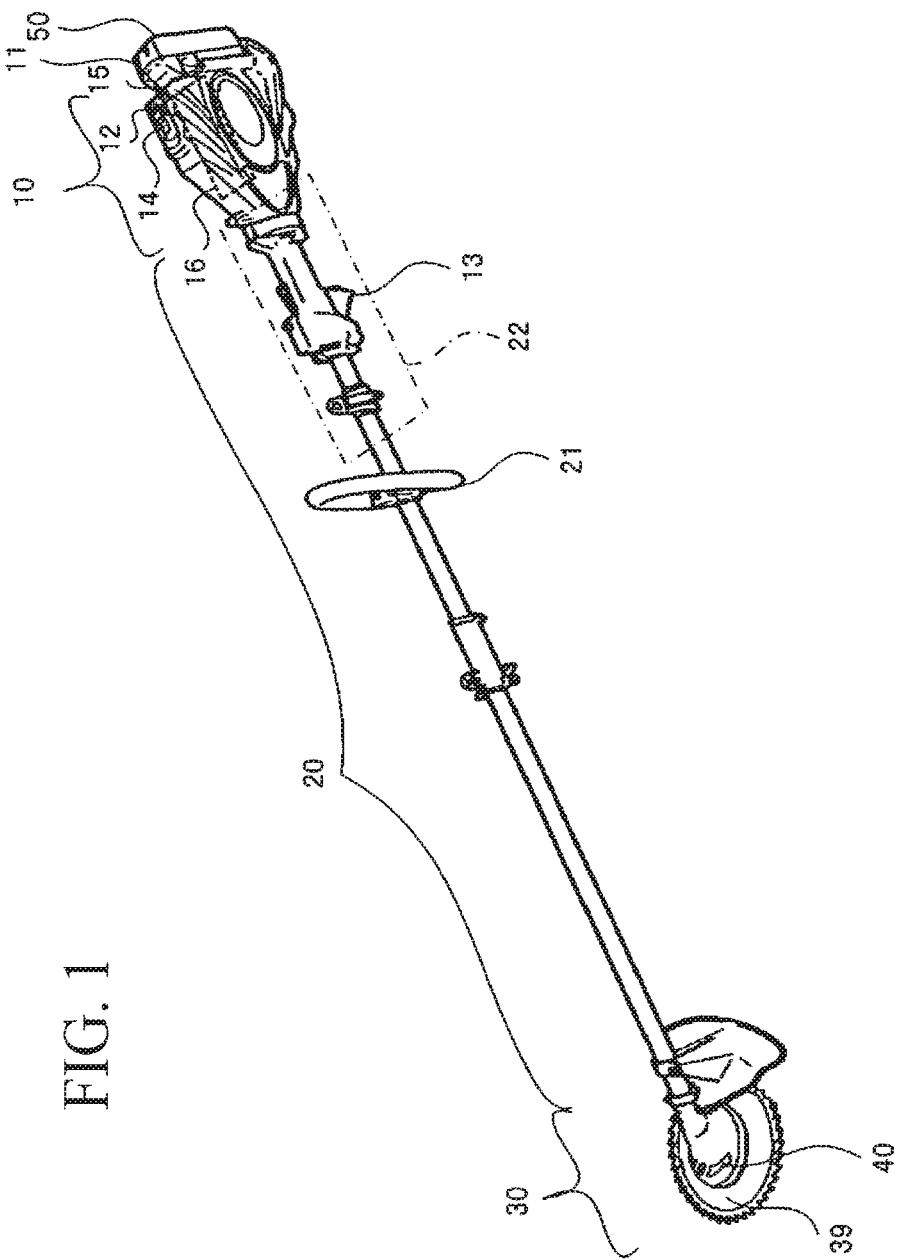
[FIG. 1]
An illustration showing the appearance of an electric operating machine according to an embodiment of the present invention.

An illustration showing the connection in the operation part of the electric operating machine in FIG. 1;

[FIG. 8]

An illustration showing a modification example of the electric operating machine in FIG. 1;

[FIG. 9]

Figure 8:
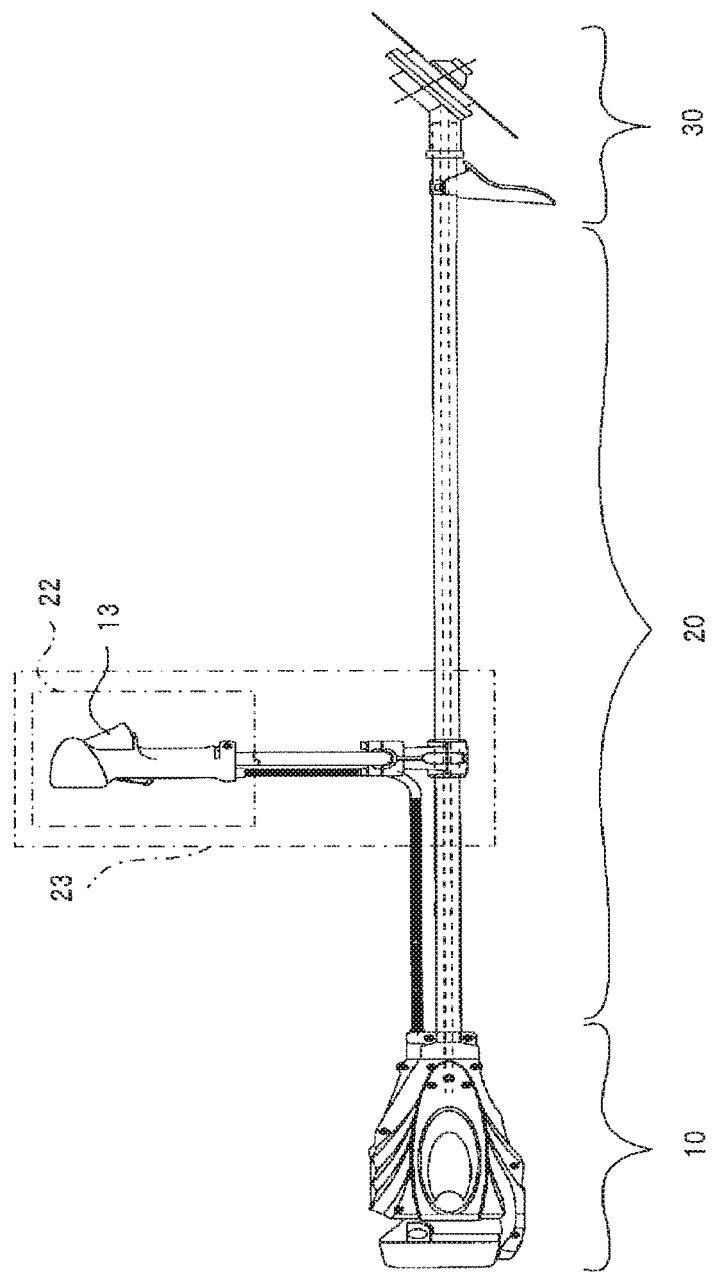

An illustration showing the connection in the operation part of the electric operating machine in FIG. 8;

[FIG. 10]

A block diagram of the power supply circuit installed in the operation part of the electric operating machine in FIG. 1;

[FIG. 11]

Figure 10:
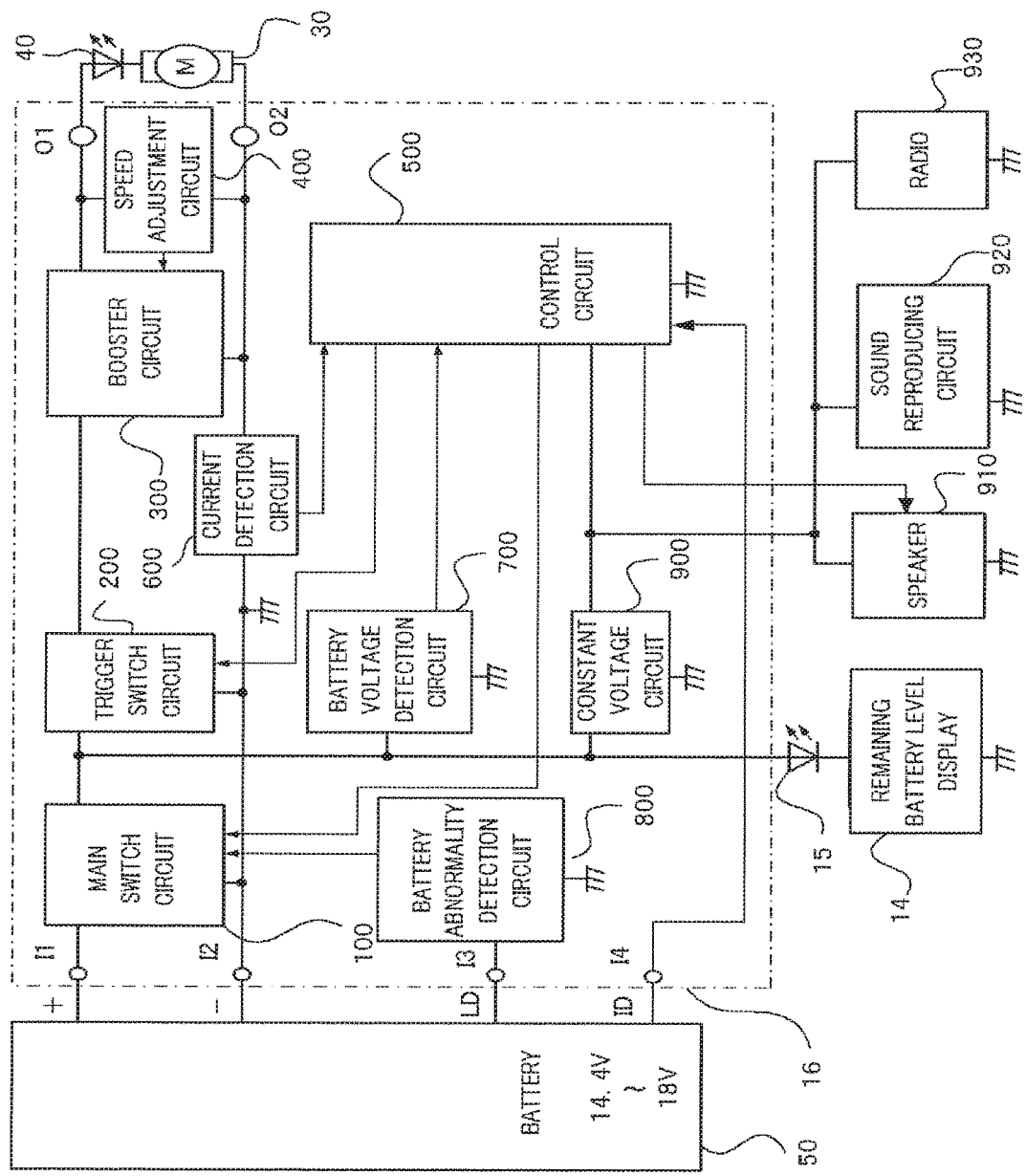

A circuit diagram of a specific example of the booster circuit and speed adjustment part of the power supply circuit in FIG. 10;

[FIG. 12]

A circuit diagram of a specific example of the current detection part of the power supply circuit in FIG. 10;

[FIG. 13]

A circuit diagram of a specific example of the battery voltage detection part of the power supply circuit in FIG. 10;

[FIG. 14]

An illustration showing a modification example of the electric operating machine in FIG. 1;

[FIG. 15]

Figure 14:
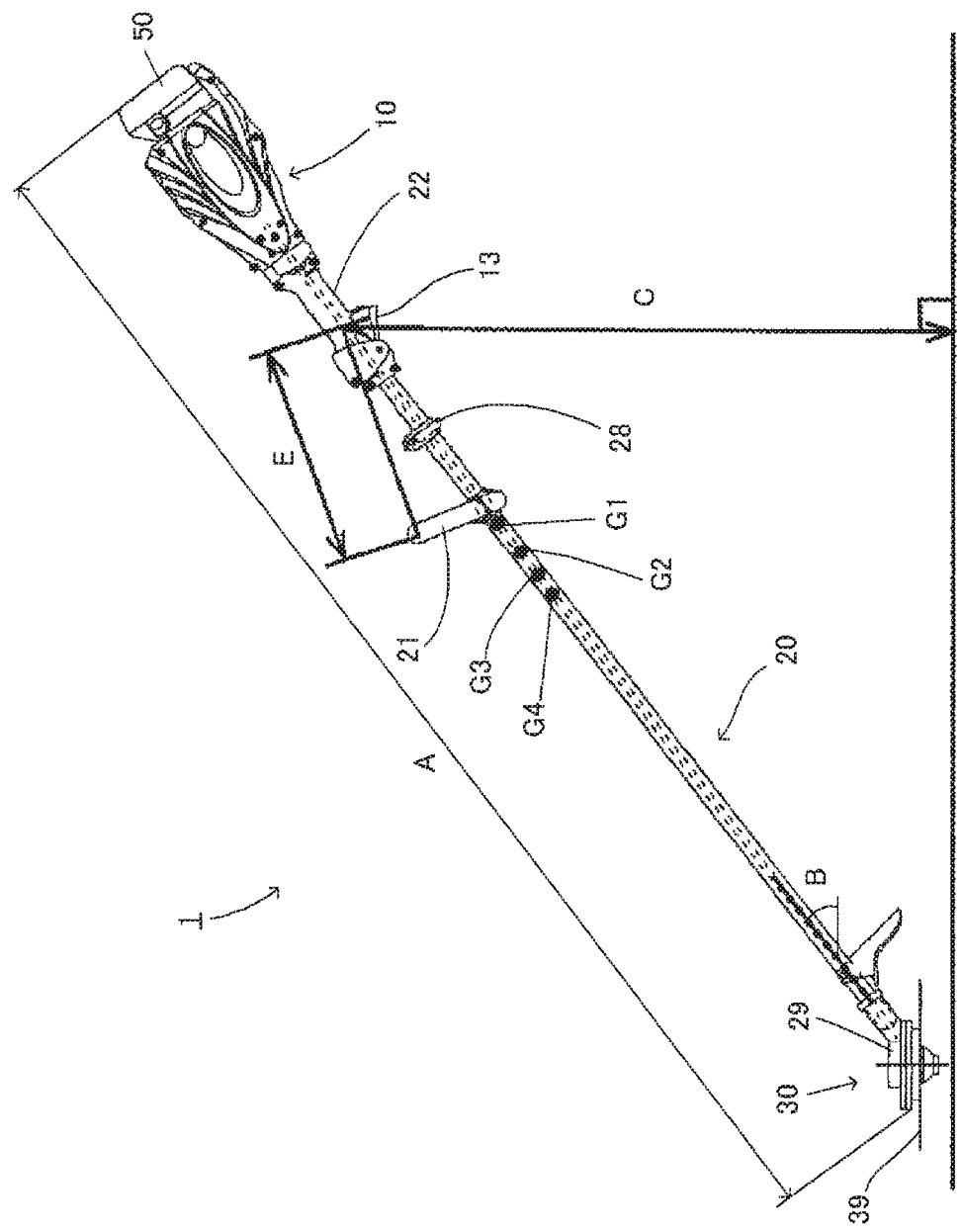

An illustration showing the electric operating machine in FIG. 14 being held;

[FIG. 16]

An illustration showing a belt for holding the electric operating machine in FIG. 14; and

[FIG. 17]

An illustration showing the working manner with the electric operating machine in FIG. 14.

DESCRIPTION OF EMBODIMENTS

The electric operating machine according to an embodiment of the present invention will be described hereafter with reference to the drawings. Here, the electric operating machine according to this embodiment is an electric lawn mower 1 including a motor that drives a rotary blade.

As shown in FIG. 1, an electric lawn mower 1 includes an operation part 10, a coupling part 20 held at the forefront of the operation part (power source part) 10 at one end, a drive part 30 held at the other end of the coupling part 20, and a blade (work tool) 39 coupled to the drive part 30. A battery mounting part 11 is provided at the rear end of the operation part 10. A main switch 12, a remaining battery level display 14, and a main LED (light emitting diode) 15 are provided on the top surface of the operation part 10. A power supply circuit 16 is provided inside the operation part 10. A D-shaped handle 21 is provided on the coupling part 20 at a distance from the operation part 10 and a grip 22 with a trigger 13 is provided next to the D-shaped handle 21. A running indicator LED 40 is provided on the top surface of the drive part 30.

The battery mounting part 11 is used to mount a battery 50. The battery mounting part 11 supplies the output of the battery 50 to the power supply circuit 16.

The main switch 12 is a switch turning ON/OFF the power supply circuit 16. When the main switch 12 is turned ON, the power supply circuit 16 is put in the standby mode. The power supply circuit 16 is not activated and supplies no electric power while the main switch 12 is OFF.

The trigger 13 is a switch controlling the value of electric power supplied to the drive part 30 from the power supply circuit 16. When the trigger 13 is pulled in the standby mode while the main switch 12 is ON, the electric power according to the pulling rate of the trigger 13 is supplied to the drive part 30 from the power supply circuit 16.

The remaining battery level display 14 is, for example, a liquid crystal screen that changes display according to the output of the battery 50. Checking on the screen displayed by the remaining battery level display 14, the user of the electric lawn mower 1 can know the approximate remaining operation time.

The main LED 15 is a first light emitting part emitting light when the main switch 12 is turned ON. Since the main LED 15 emits light when the main switch 12 is turned on, the operator can easily confirm that the main switch 12 is ON/OFF.

The power supply circuit 16 converts the voltage output from the battery 50 to a voltage of a value corresponding to the pulling rate of the trigger 13 regardless of the output voltage magnitude from the battery 50 and outputs it. The power supply circuit 16 further include a function of protecting the battery 50 and drive part 30 against overcurrent and overvoltage, imposing mandatory OFF on the output according to the output voltage of the battery 50 or the value of current supplied to the drive part 30. Details of operation and a specific circuit of the power supply circuit 16 will be described later.

Since the power supply circuit 16 applies to the drive part 30 a voltage of a value according to the pulling rate of the trigger 13 regardless of the output voltage of the battery 50, the type of the battery 50 does not matter. This embodiment is explained as a case in which the battery 50 is, for example, a lithium ion rechargeable battery. The battery 50 comprises a substrate, multiple battery cells provided on the substrate, and plus and minus terminals provided on the substrate. The battery 50 also comprises an LD terminal. When a circuit provided on the substrate of the battery 50 detects overdischarge from the battery cells, abnormal signals are output from the LD terminal. The battery 50 also comprises an ID terminal. Battery information such as specification of the battery 50 stored in the memory on the substrate of the battery 50 is output from the ID terminal. The battery 50 applies a voltage between the plus and minus terminals to the power supply circuit 16.

As described later, the electric lawn mower 1 further comprises a speaker, a radio, and a sound reproducing device, which are driven by the electric power supplied from the operation part 10.

The coupling part 20 includes a hollow tube made of a lightweight, rigid material such as aluminum alloy and reinforced plastic. The coupling part 20 mechanically connects the operation part 10 and drive part 30 and supplies the electric power output from the power supply circuit 16 to the drive part 30 via a conductive wire running through the inside thereof.

Holding the D-shaped handle 21 and grip 22, the user uses the electric lawn mower 1. The operation part 10 and drive part 30 are provided on the coupling part 20 at a distance as described above; therefore, the gravity center of the electric lawn mower 1 is away from the operation part 10. The user receives a proper weight, improving the operability.

The drive part 30 rotates the attached blade 39 with the input electric power. The drive part 30 consists of, for example, a coreless motor.

The drive part 30 consisting of a coreless motor assures a higher level of quietness. Furthermore, a lithium ion battery is used to drive the coreless motor; a lightweight, low power consumption electric lawn mower 1 having extended operation time can be constructed. Furthermore, using a booster circuit 300 as described later, sufficiently high rotation speed operation is available with a small capacity battery.

The running indicator LED 40 is a second light emitting part emitting light while the drive part 30 is powered. The running indicator LED 40 consists of, for example, an organic EL. The running indicator LED 40 emits light while the drive part 30 is powered. Then, the running indicator LED 40 emits light even if the drive part 30 does not rotate because of, for example, shortage in torque. In this way, the user can know whether or not the drive part 30 is powered from the running indicator LED 40. Furthermore, when the user cannot know whether or not the drive part 30 is driven from the driving sound of the drive part 30, the running indicator LED 40 allows the user to know whether or not the drive part 30 is driven.

Figure 2:
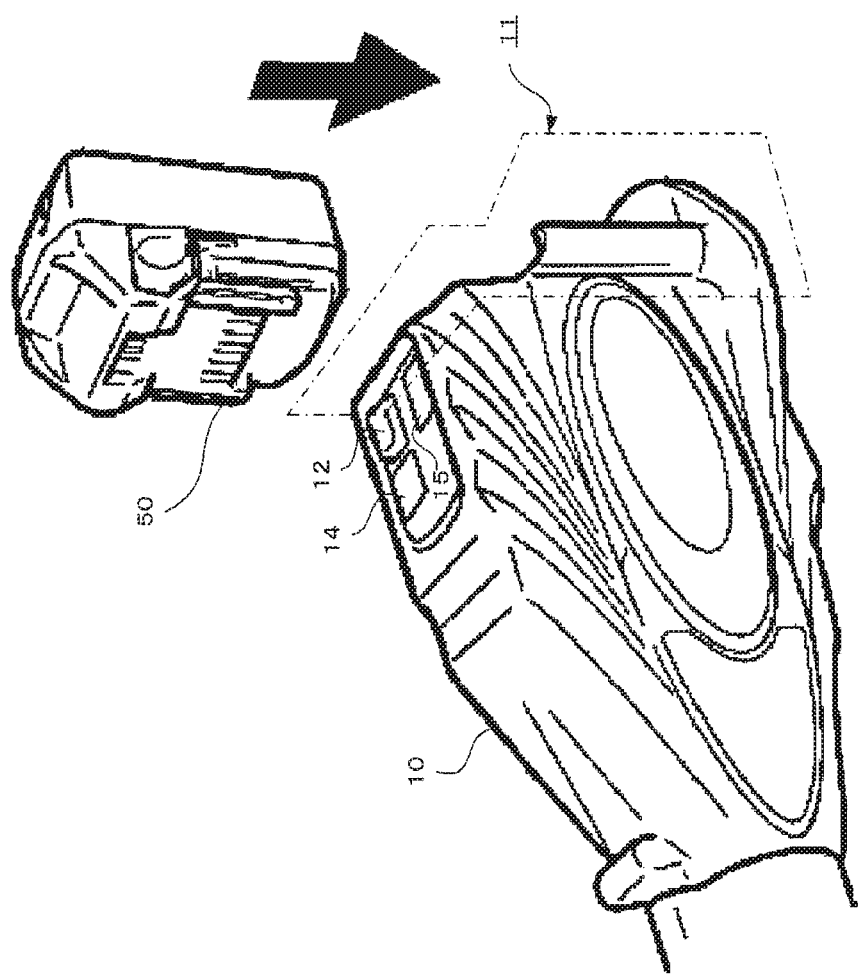
[FIG. 2]
An enlarged view of the operation part of the electric operating machine in FIG. 1.

As shown in FIG. 2, the battery 50 is detachably fitted in the battery mounting part 11 in the direction from the top surface to bottom surface. With the battery 50 being fitted in the battery mounting part 11, the output terminals of the battery 50 are connected to the input terminals of the operation part 10.

Figure 3:
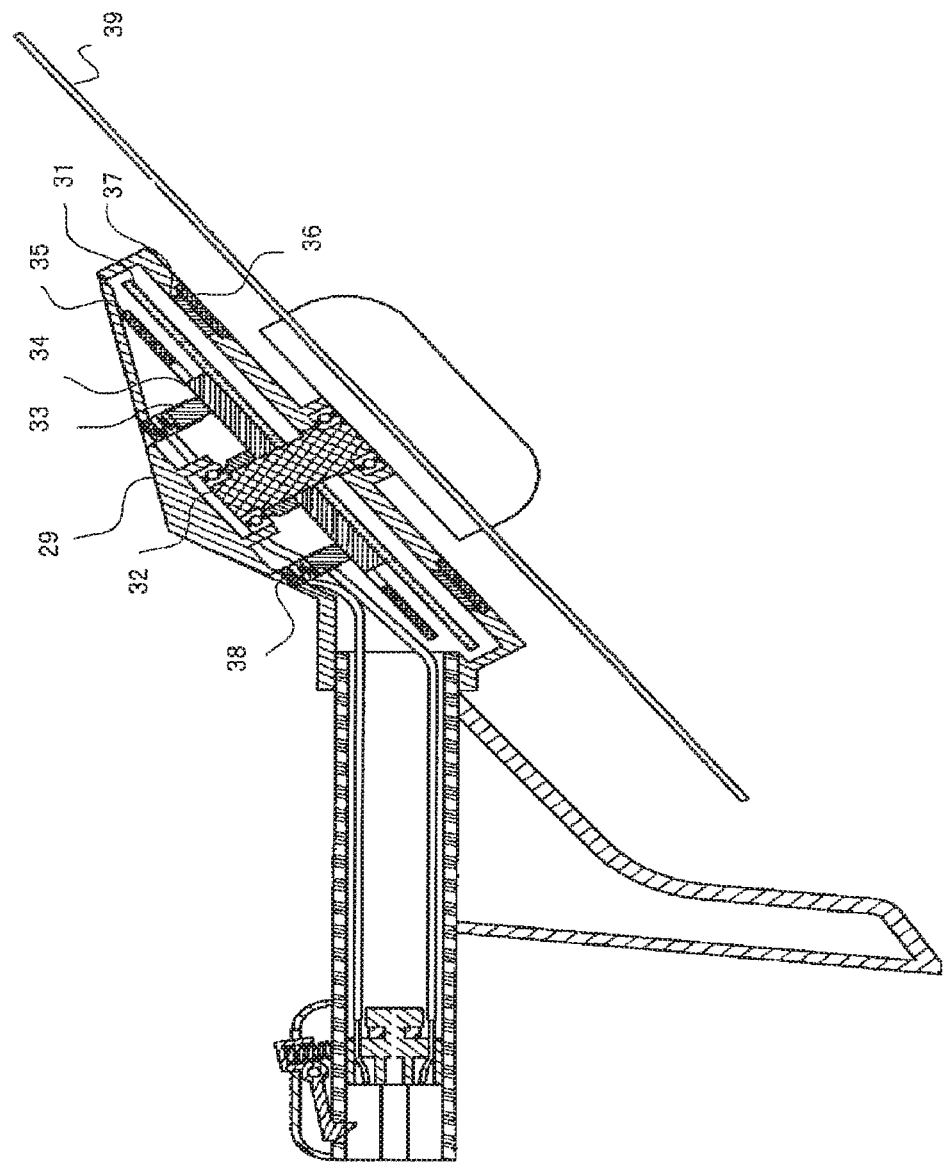
[FIG. 3]
A cross-sectional view of the drive part of the electric operating machine in FIG. 1.

The drive part 30 consisting of a coreless motor primarily comprises, as shown in FIG. 3, a motor case 29, a coil substrate 31, a central shaft (output shaft) 32, a brush 33, a commutator 34, an upper yoke 35, a lower yoke 36, a magnet part 37, and a brush cap 38.

The motor case 29 immobilizes the upper yoke 35, lower yoke 36, and brush cap 38. The coil substrate 31 is secured by the central shaft 32 passing through the center of the motor case 29. The commutator 34 is fixed to one surface of the coil substrate 31. The upper yoke 35 is fixed to the motor case 29 at a not-shown position. The lower yoke 36 is fitted in and fixed to the motor case 29. The magnet part 37 is fixed to one surface of the lower yoke 36. The brush cap 38 is fixed to the motor case 29. The brush 33 is supported and biased toward the commutator 34 by a spring that the motor case 29 includes.

The motor case 29 is a hollow case made of a lightweight, rigid material such as aluminum alloy and reinforced plastic. The coil substrate 31 is a nearly disc-shaped plate on which multiple coils are arranged.

Passing through the coil substrate 31 and commutator 34, the central shaft 32 is secured to the coil substrate 31. The coil substrate 31 and commutator 34 rotates as one piece as the central shaft 32 rotates. The electric power supplied from the operation part 10 via a conductive wire passing through the inside of the coupling part 20 is supplied to the coil substrate 31 via the brush 33. The commutator 34 consists of commutator segments and insulating segments connected to the coil substrate 31 and alternately arranged in a circle around the central shaft. The commutator 34 allows only one direction of current supplied from the brush 33 to run to the coil substrate 31. The magnet part 37 has planar magnets magnetized in the axial direction and arranged in the circumferential direction, forming a magnetic circuit via the upper and lower yokes 35 and 36.

As shown in FIG. 4, the rotor of the coreless motor comprises a central shaft 32, a flange 132, and, from the top in FIG. 4, a commutator 34 and a coil substrate 31 consisting of five coil substrate parts 131. The commutator 34 and coil substrate 31 are each a printed-wiring board composed of an insulator substrate and a conductor pattern.

Figure 5:
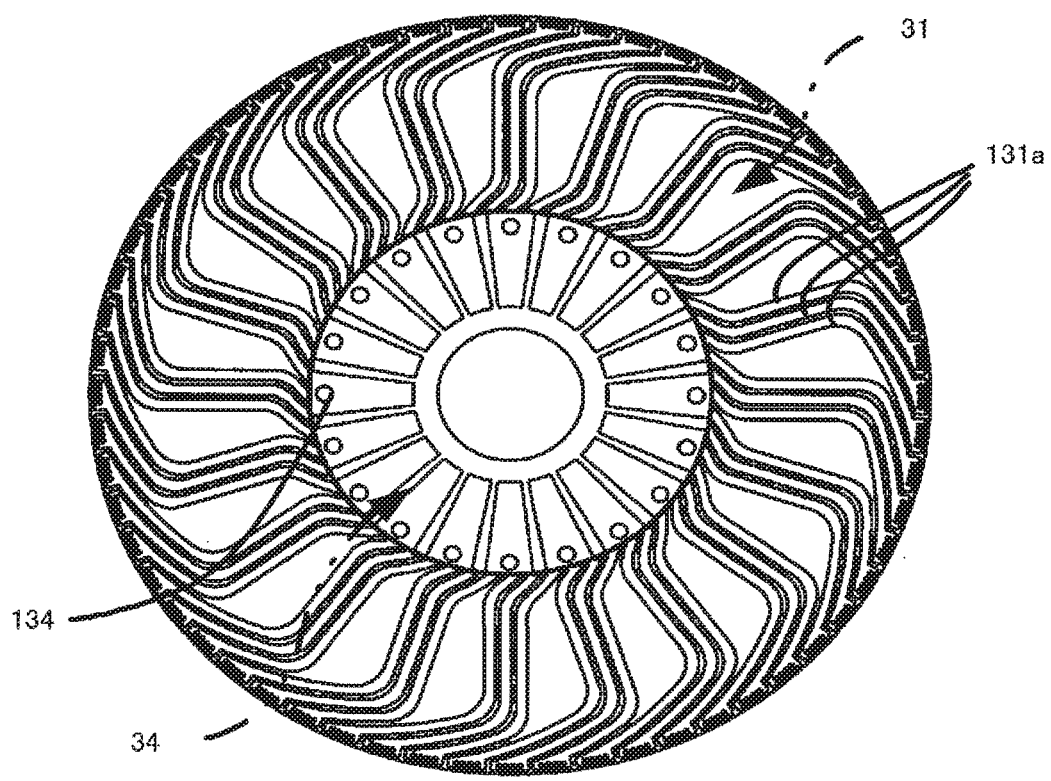
[FIG. 5]
A top view of the rotor in FIG. 4.

As shown in FIG. 5, a conductor pattern for commutator segments 134 making contact with the brush 33 is formed on the top surface of the commutator 34. The conductor pattern has an annular form around the central shaft 32 seen in the axial direction of the central shaft 32. Each commutator segment 134 has a through-hole penetrating the commutator 34 at the outer end. A conductor pattern on the top surface of the coil substrate part 131 provides multiple coil segments 131a arranged in a radial pattern about the central shaft 32 and bent in given directions about the axis of the central shaft 32.

Figure 6:
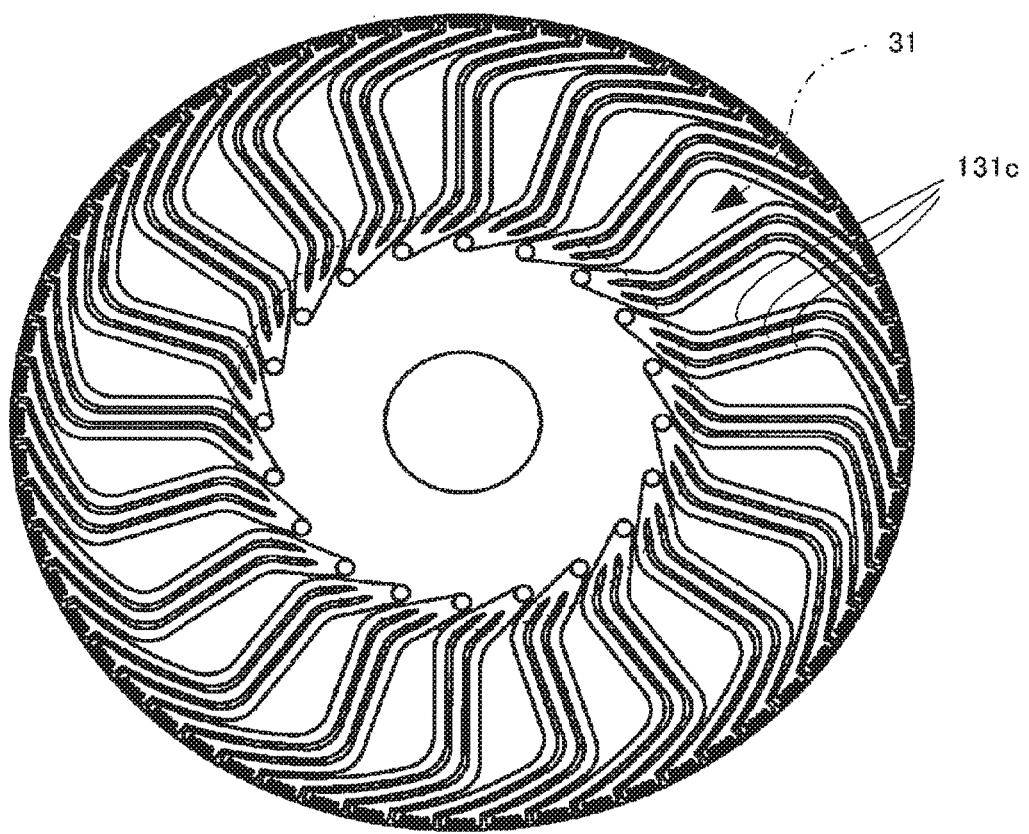
[FIG. 6]

As shown in FIG. 6, each coil segment 131c is connected to the corresponding commutator segment 134 via a through-hole at the inner end. Each coil segment 131c has multiple through-holes penetrating the coil substrate part 131 at the outer end.

A conductor pattern on the bottom surface of the coil substrate part 131 is nearly equal to the coil segments 131a and 131c shown in FIGS. 5 and 6 and provides multiple not-shown coil segments arranged in a radial pattern about the central shaft 32. The outer end of each not-shown coil segment is connected to the corresponding coil segment on the top surface via solder filled in the through-hole. The inner end of each not-shown coil segment is connected to the corresponding commutator segment 134 of the commutator 34 via solder filled in the through-hole. Then, the multiple coil segments 131a and 131c and multiple not-shown coil segments in the coil region constitute multiple coils in the form of a nearly horizontal U-shape (an example of a nearly annular form) seen in the axial direction of the central shaft 32. The multiple coils are arranged in the circumferential direction around the central shaft 32. The ends of the coils are connected to the corresponding commutator segments 134 of the commutator 34.

The conductor pattern for the commutator segments 134 of the commutator 34 has a thickness larger than the coil segments of the coil substrate parts in order to curb damage due to abrasion by the brush 33. Not-shown insulating layers are interposed between the commutator 34 and coil substrate 31 and between multiple coil substrate parts 131.

The magnetic flux of the magnetic circuit formed via the upper and lower yokes 35 and 36 passes through the coils of the coil substrate 31 in the axial direction of the central shaft 32. The motor case 29 housing the magnet part 37 and upper and lower yokes 35 and 36 constitutes the stator of the coreless motor. The central shaft 32 and coil substrate 31 secured to the central shaft 32 as the rotor and the magnet part 37, upper and lower yokes 35 and 36, and brush 33 as the stator constitute the direct current rectifier motor of the coreless motor. Here, the magnet part 37 and upper and lower yokes 35 and 36 constitute a magnetic flux generation means forming a magnetic circuit. The magnetic flux generation means is not restricted to this structure as long as the magnetic flux passes through the coils of the coil substrate 31 in the axial direction of the central shaft 32. For example, the magnetic flux generation means can consist of multiple permanent magnets, electromagnets, or only coils.

The blade 39 rotates in conjunction with the central shaft 32 rotates. As the blade 39 rotates, the target is mowed.

Figure 7:
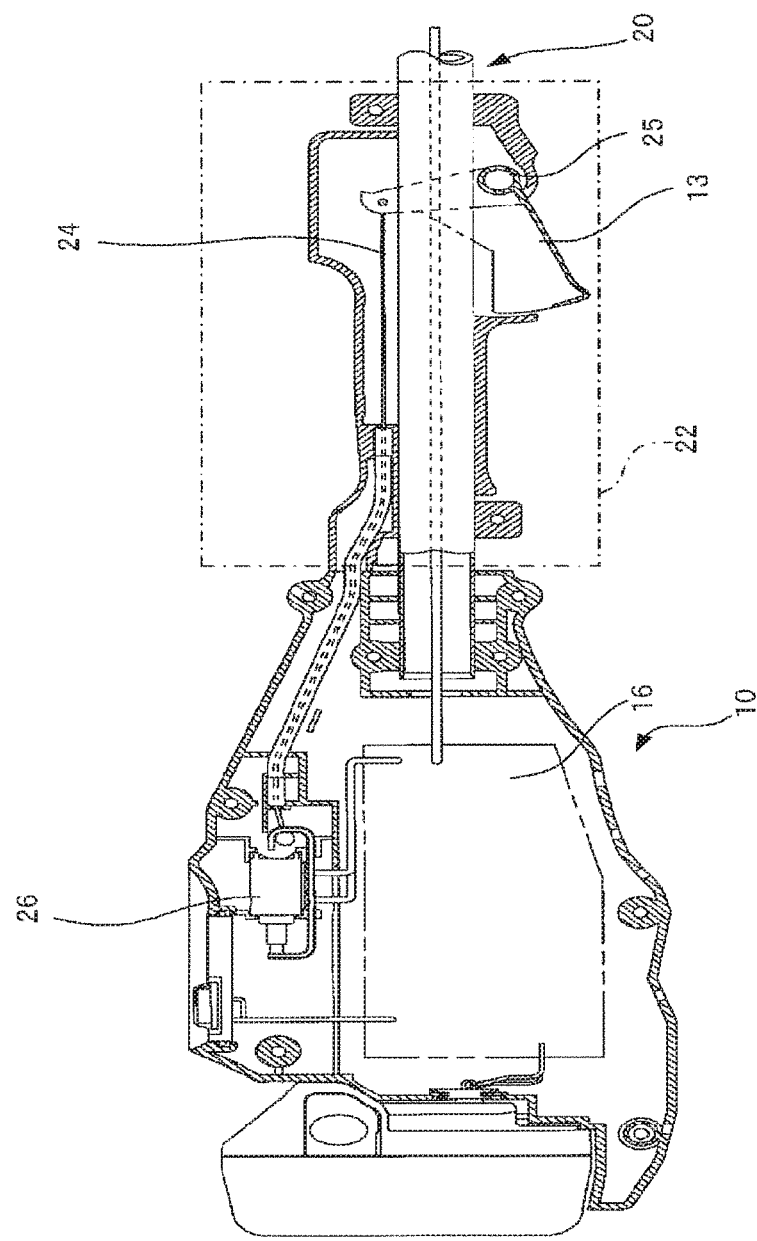

The connection between the operation part 10 and trigger 13 of the electric lawn mower 1 in FIG. 1 is shown in detail in FIG. 7.

The grip 22 is formed integrally with the operation part 10 and provided along the periphery of the coupling part 20. The grip 22 is provided with a rotation shaft 25, to which the trigger 13 is coupled. A wire 24 is connected to the trigger 13. The trigger 13 is coupled to a variable speed switch 26 provided in the operation part 10 via the wire 24. The grip 22 may be close to the operation part 10 with a space therebetween, which is regarded as equivalent to a situation where the grip 22 is next to the operation part 10.

When the trigger 13 is pulled, the wire 24 is tugged about the rotation shaft 25. The wire 24 transfers the pulling rate of the trigger 13 to the variable speed switch 26. The variable speed switch 26 supplies the pulling rate of the trigger 13 to the power supply circuit 16. The power supply circuit 16 adjusts the output voltage according to the pulling rate of the trigger 13.

The electric lawn mower 1 can have a U-shaped handle 23 as shown in FIG. 8 in place of the D-shaped handle 21. In such a case, the U-shaped handle 23 is provided on the coupling part 20 at a distance from the operation part 10 and the trigger 13 is provided at one end of the U-shaped handle 23.

The U-shaped handle 23 consists of a U-shaped hollow pipe and has grips 22 at the ends. The trigger 13 is provided to one of the grips 22.

Figure 9:
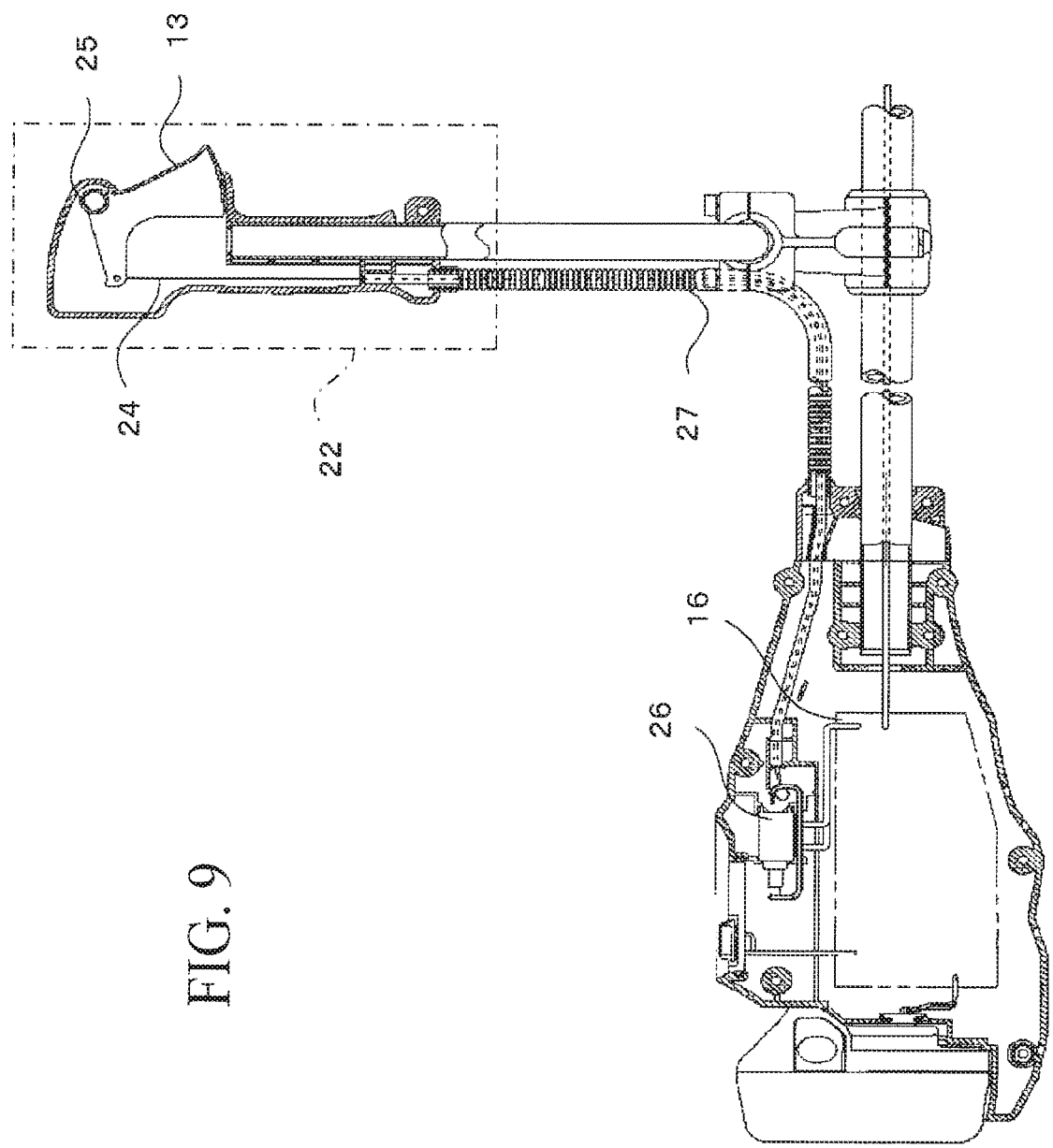

As shown in FIG. 9, the U-shaped handle 23 comprises grips 22 at the ends, a rotation shaft 25 at one of the grips 22, a trigger 13 coupled to the rotation shaft 25, a wire 24 coupling the variable speed switch 26 in the operation part 10 to the trigger 13, and a resin cover 27 covering the wire 24.

When the trigger 13 is pulled, the wire 24 is tugged about the rotation shaft 25. The wire 24 transfers the pulling rate of the trigger 13 to the variable speed switch 26. The variable speed switch 26 supplies the pulling rate of the trigger 13 to the power supply circuit 16. The power supply circuit 16 adjusts the output voltage according to the pulling rate of the trigger 13. The resin cover 27 protects the wire 24 from mechanical stress.

The power supply circuit 16 will be described hereafter with reference to FIGS. 10 to 13.

The power supply circuit 16 comprises, as shown in FIG. 10, input terminals I1, I2, I3, and I4, a main switch circuit 100, a trigger switch circuit 200, a booster circuit 300, a speed adjustment circuit (speed adjustment part, voltage measuring part) 400, a control circuit 500, a current detection circuit 600, a battery voltage detection circuit 700, a battery abnormality detection circuit 800, a constant voltage circuit 900, and output terminals O1 and O2.

After the battery 50 is mounted on the battery mounting part 11, the input terminal I1 is connected to the plus terminal (+) of the battery 50; the input terminal I2, to the minus terminal (−) of the battery 50; the input terminal I3, to the LD terminal of the battery 50; and the input terminal I4, to the ID terminal of the battery 50. On the other hand, the running indicator LED 40 and drive part 30 are series-connected between the output terminals O1 and O2.

The input terminal I1 is connected to the main switch circuit 100. The input terminal I2 is grounded. The input terminal I3 is connected to the battery abnormality detection circuit 800. The input terminal I4 is connected to the control circuit 500.

The output of the main switch circuit 100 is supplied to the trigger switch circuit 200, battery voltage detection circuit 700, constant voltage circuit 900, and anode of the main LED 15. The cathode of the main LED 15 is connected to the remaining battery level display 14. The main switch circuit 100 consists of, for example, a switch activated as the main switch 12 is turned ON and a self-arc extinguishing element such as IGBT (insulated gate bipolar transistor) and MOSFET (metal oxide semiconductor field effect transistor).

The trigger switch circuit 200 is connected between the main switch circuit 100 and booster circuit 300. The trigger switch circuit 200 consists of, for example, a switch activated as the trigger 13 is pulled and a self-arc extinguishing element such as IGBT and MOSFET.

The booster circuit 300 is connected between the trigger switch circuit 200 and output terminal O1. The booster circuit 300 is, for example, a flyback booster circuit.

The speed adjustment circuit 400 is so connected as to provide feedback on the output of the booster circuit 300 to the booster circuit 300. The speed adjustment circuit 400 consists of, for example, a voltage dividing resistor and a variable resistor having a resistance varied according to the pulling rate of the trigger 13.

The control circuit 500 receives the output of the constant voltage circuit 900, output of the current detection circuit 600, output of the battery voltage detection circuit 700, and the input to the input terminal I4. The output of the control circuit 500 is supplied to the main switch circuit 100, trigger switch circuit 200, and speaker 910. The control circuit 500 is, for example, a microcomputer.

The current detection circuit 600 is connected to the output terminal O2 at one terminal and grounded at the other terminal. The current detection circuit 600 is, for example, an ampere meter.

The battery voltage detection circuit 700 is connected to the output of the main switch circuit 100 as described above. The output of the battery voltage detection circuit 700 is supplied to the control circuit 500.

The output of the battery abnormality detection circuit 800 is supplied to the main switch circuit 100. The battery voltage detection circuit 700 is, for example, an off-latch circuit.

The output of the constant voltage circuit 900 is supplied to the control circuit 500, speaker 910, sound reproducing circuit 920, and radio 930. The constant voltage circuit 900 is a circuit outputting a constant value voltage from the voltage output from the battery 50 and consists of, for example, a three-terminal regulator and a smoothing capacitor.

The power supply circuit 16 having the above-described structure is driven by a voltage applied between the input terminals I1 and I2.

After the battery 50 is mounted on the battery mounting part 11, electric power is supplied from the battery 50 to the main switch circuit 100.

The main switch circuit 100 is a switch associated with ON/OFF of the main switch 12. The main switch circuit 100 is turned ON when the main switch 12 is turned ON. The main switch circuit 100 is turned OFF when the main switch 12 is turned OFF. The main switch circuit 100 is further turned ON/OFF by the control circuit 500 while the main switch 12 is ON.

While the main switch 12 is ON, the main switch circuit 100 supplies the electric power output from the battery 50 to the trigger switch circuit 200, constant voltage circuit 900, and remaining battery level display 14. While the main switch 12 is OFF, the main switch circuit 100 blocks the electric power supplied from the battery 50.

The trigger witch circuit 200 is a switch associated with the trigger 13. The trigger switch circuit 200 is turned ON when the pulling rate of the trigger 13 is equal to or higher than a given value. The trigger switch circuit 200 is further turned ON/OFF by the control circuit 500. While the trigger switch circuit 200 is ON, the trigger switch circuit 200 supplies the electric power supplied from the main switch circuit 100 to the booster circuit 300. While the trigger switch circuit 200 is OFF, the trigger switch circuit 200 blocks the electric power.

The booster circuit 300 boosts the electric power supplied from the trigger switch circuit 200 and outputs it from the output terminal O1. The output of the booster circuit 300 is adjusted by the speed adjustment circuit 400. The booster circuit 300 adjusts the output so that the voltage input from the speed adjustment circuit 400 always stays constant. The voltage boosted by the booster circuit 300 is applied to the drive part 30 connected to the output terminals O1 and O2.

The speed adjustment circuit 400 is a circuit measuring the voltage applied to the motor and adjusting the output of the booster circuit 300 according to the pulling rate of the trigger 13. The speed adjustment circuit 400 provides feedback on the output of the booster circuit 300, whereby the booster circuit 30 outputs a voltage of a target value. The speed adjustment circuit 400 supplies the voltage divided between the voltage dividing resistor and variable resistor to the booster circuit 300.

The current detection circuit 600 detects the current running toward the drive part 30 and outputs it to the control circuit 500. The battery voltage detection circuit 700 detects the voltage output from the battery 50 and outputs it to the control circuit 500.

The control circuit 500 mandatorily turns OFF the main switch circuit 100 or trigger switch circuit 200, for example, when the current running toward the drive part 30 exceeds the rated value of the drive part 30 or when the voltage output from the battery 50 becomes lower than a given value. The control circuit 500 executes programs stored in the memory in advance so as to turn OFF the main switch circuit 100 or trigger switch circuit 200 according to the current running toward the drive part 30, which is detected by the current detection circuit 600, and the voltage output from the battery 50, which is detected by the battery voltage circuit 700. Furthermore, when the control circuit 500 detects no electric power being supplied to the drive part 30 for a given period of time while the main switch circuit 100 is ON, the control circuit 500 automatically turns OFF the main switch circuit 100. Furthermore, the control circuit 500 receives battery information from the ID terminal via the input terminal 4. Receiving battery information, the control circuit 500 makes reference to a table stored in the internal memory in advance and reads the voltage at which the battery starts overly discharging based on the battery information. For example, the control circuit 500 obtains an overdischarge voltage of 8 V if the battery information includes a rated voltage of 14.4 V and an overdischarge voltage of 10 V if the battery information includes a rated voltage of 18 V. The control circuit 500 automatically turns OFF the main switch circuit 100 when the output voltage of the battery 50 becomes lower than the overdischarge voltage. The overdischarge voltage is a reference voltage where the battery 50 reaches a state of overdischarge when the actual output voltage of the batter 50 constantly decreases. Also, the overdischarge voltage is larger than this output voltage by a predetermined value. When the output voltage of the battery 50 falls below the overdischarge voltage, the main switch circuit 100 is automatically turned OFF as overdischarge occurs shortly thereafter.

The battery abnormality detection circuit 800 turns OFF the main switch circuit 100 when it receives signals from the LD terminal and mandatorily keeps the main switch circuit 100 OFF until it receives no input from the LD terminal or the battery 50 is dismounted.

The constant voltage circuit 900 is a circuit outputting a voltage of a constant value from the voltage output from the battery 50. The output of the constant voltage circuit 900 is supplied to the control circuit 500 and also to the speaker 910, sound reproducing circuit 920, and radio 930.

The speaker 910 makes sound based on input sound information.

Furthermore, when the current detection circuit 600 detects more than a given value of current running toward the drive part 30, the control circuit 500 instructs the speaker 910 to make sound for the case of overcurrent. Similarly, when the battery 50 starts overly discharging, the speaker 910 announces the overdischarge. When the battery 50 undergoes an abnormal event, the speaker 910 announces that the battery 50 undergoes an abnormal event.

The sound reproducing circuit 920 operates on the output of the constant voltage circuit 900. The sound reproducing circuit 920 decodes sound data such as music data stored in the internal memory and outputs them to the speaker 910. The radio 930 has an antenna. The radio 930 tunes the antenna properties and receives radio waves of a particular frequency, detects sound information superimposed on carrier waves from the received radio waves, and outputs the detected sound information to the speaker. These operations are performed on the output of the constant voltage circuit 900; therefore, they are activated as the main switch circuit 100 is turned ON.

An example of a specific circuit of the booster circuit 300 will be described hereafter.

Figure 11:
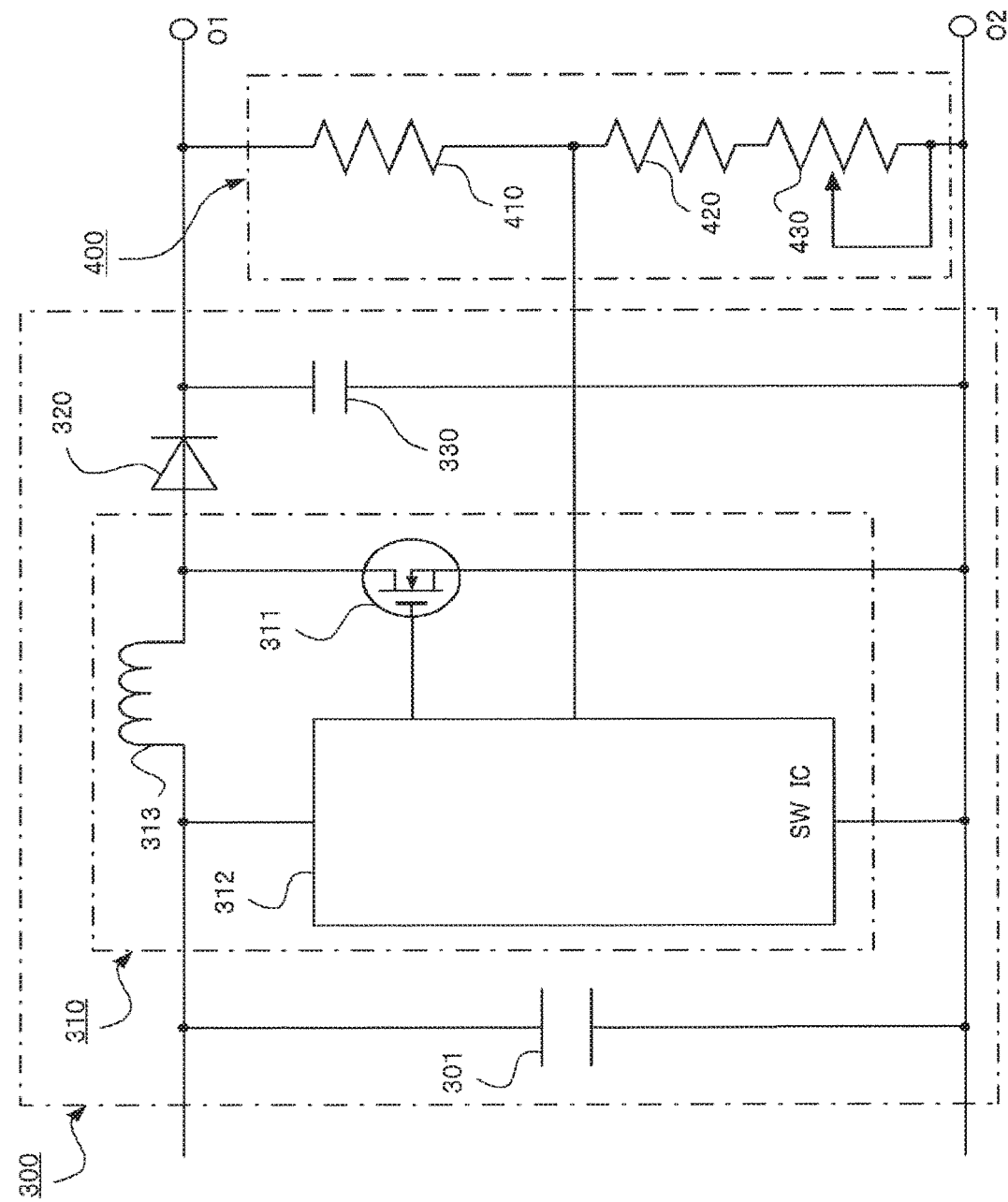

As shown in FIG. 11, the booster circuit 300 consists of, for example, a smoothing circuit 301, a booster circuit 310, a rectifier diode 320, and a smoothing capacitor 330. The speed adjustment circuit 400 consists of a series circuit composed of a voltage dividing resistor 410, a voltage dividing resistor 420, a variable resistor 430.

The smoothing capacitor 301 is parallel-connected between the trigger switch circuit 200 and booster circuit 310. The booster circuit 310 is series-connected between the trigger switch circuit 200 and rectifier diode 320. The rectifier diode 320 is series-connected between the booster circuit 310 and output terminal O1. The smoothing capacitor 330 is parallel-connected between the rectifier diode 320 and output terminal O1.

The speed adjustment circuit 400 is connected between the output terminals O1 and O2. The output of the speed adjustment circuit 400 is connected to the booster circuit 310. In the speed adjustment circuit 400, the voltage dividing resistors 410 and 420 are series-connected and the variable resistor 430 is further series-connected thereto.

The smoothing capacitor 301 removes extra vibration of the voltage supplied from the trigger switch circuit 200 so as to smooth the waveform.

The booster circuit 310 is a booster chopper circuit consisting of, for example, an FET (field effect transistor) 311, a switching IC (integrated circuit) 312, and a choke coil 313.

With the switching IC 312 repeatedly turning ON/OFF the FET 311, the booster circuit 310 boosts the input voltage by means of the flyback effect of the choke coil 313 and outputs the boosted voltage.

The FET 311 is turned ON when a voltage equal to or higher than a threshold voltage is applied to the gate terminal by the switching IC 312, allowing a current to run between the source and drain terminals. The FET 311 is turned OFF when a voltage lower than the threshold voltage is applied to the gate terminal, allowing no current to run between the source and drain terminals.

The switching IC 312 applies a high level of voltage equal to or higher than a threshold voltage of the FET 311 or a low level of voltage lower than the threshold voltage to the gate terminal of the FET 311 to turn ON/OFF the FET 311 according to the voltage input from the speed adjustment circuit 400. The switching IC 312 adjusts the ON/OFF switching frequency of the voltage applied to the gate terminal of the FET 311 so that the voltage input from the speed adjustment circuit 400 has a target value. For example, the switching IC 312 increases the ON/OFF switching speed of the FET 311 when the voltage input from the speed adjustment circuit 400 is lower than a target value, and decreases the ON/OFF switching speed of the FET 311 when the voltage input from the speed adjustment circuit 400 is higher than the target value.

The choke coil 313 yields flyback effect as the ON/OFF switching of the FET 311 occurs. The flyback effect causes the voltage between the terminals of the choke coil 313 to rise.

The rectifier diode 320 rectifies the output of the booster circuit 310. The smoothing capacitor 330 removes extra vibration of the voltage rectified by the rectifier diode 320 so as to smooth the waveform.

The voltage divided between the voltage dividing resistor 410 and the voltage dividing resistor 420 and variable resistor 430 is supplied to the switching IC 312.

The variable resistor 430 has a resistance varied according to the pulling rate of the trigger 13. The resistance of the variable resistor 430 drops as the pulling rate of the trigger 13 is increased and rises as the pulling rate of the trigger 13 is decreased.

For example, as the user increases the pulling rate of the trigger 13, the resistance of the variable resistance 430 drops and the voltage applied to the switching IC 312 from the speed adjustment circuit 400 drops. Then, the switching IC 312 shortens the switching cycle of the FET 311. As the cycle of switching ON/OFF the FET 311 is shortened, the peak value of the voltage between the terminals of the choke coil 313 rises and the voltage supplied to the switching IC 312 from the speed adjustment circuit 400 rises.

As described above, the speed adjustment circuit 400 provides feedback on the output of the booster circuit 300, whereby the booster circuit 300 adjusts the output so that the voltage input from the speed adjustment circuit 400 always stays constant.

The above operation is performed also when the voltage supplied to the booster circuit 300 from the trigger switch circuit 200 varies because of the decrease in the output of the battery 50, the replacement to another battery from the battery 50, or the like. For example, when the output of the battery 50 drops, the voltage output from the booster circuit 300 accordingly drops. As the output of the booster circuit 300 drops, the voltage supplied to the booster circuit 300 from the speed adjustment circuit 400 drops. Then, the booster circuit 300 further raises the output voltage. The output voltage of the booster circuit 300 is adjusted until the voltage input from the speed adjustment circuit 400 has a target value.

In this way, the booster circuit 300 and speed adjustment circuit 400 allow the electric lawn mower 1 to operate at a target rotation speed regardless of different output from the battery 50.

Incidentally, the voltage dividing resistors 410 and 420 and variable resistor 430 have relatively high impedances compared with the drive part 30. Therefore, the speed adjustment circuit 400 consumes almost no electric power.

The control circuit 500, current detection circuit 600, voltage detection circuit 700, and battery abnormality detection circuit 800 of the power supply circuit 16 will be described hereafter with reference to FIGS. 12 and 13.

Figure 12:
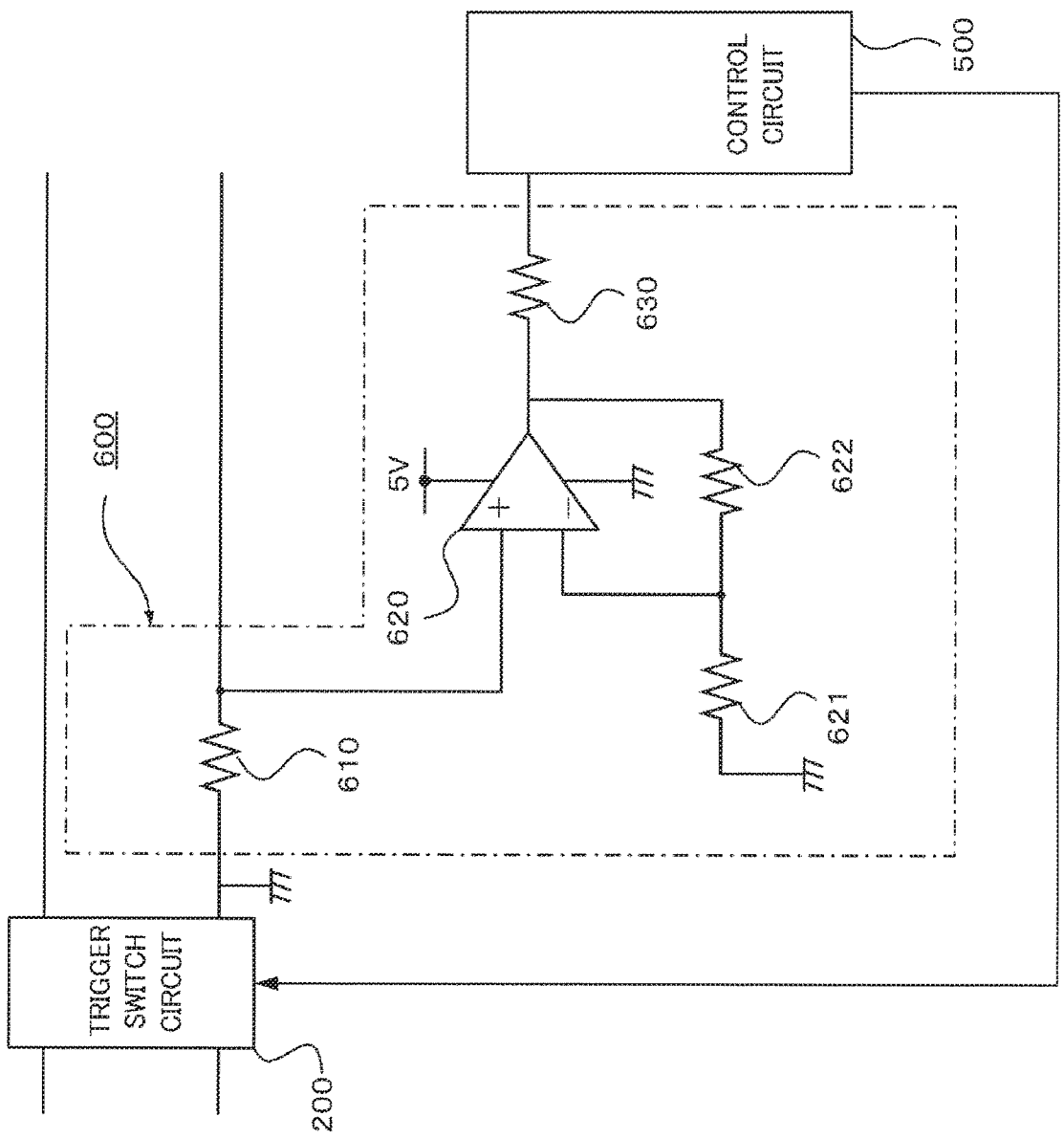
Figure 13:
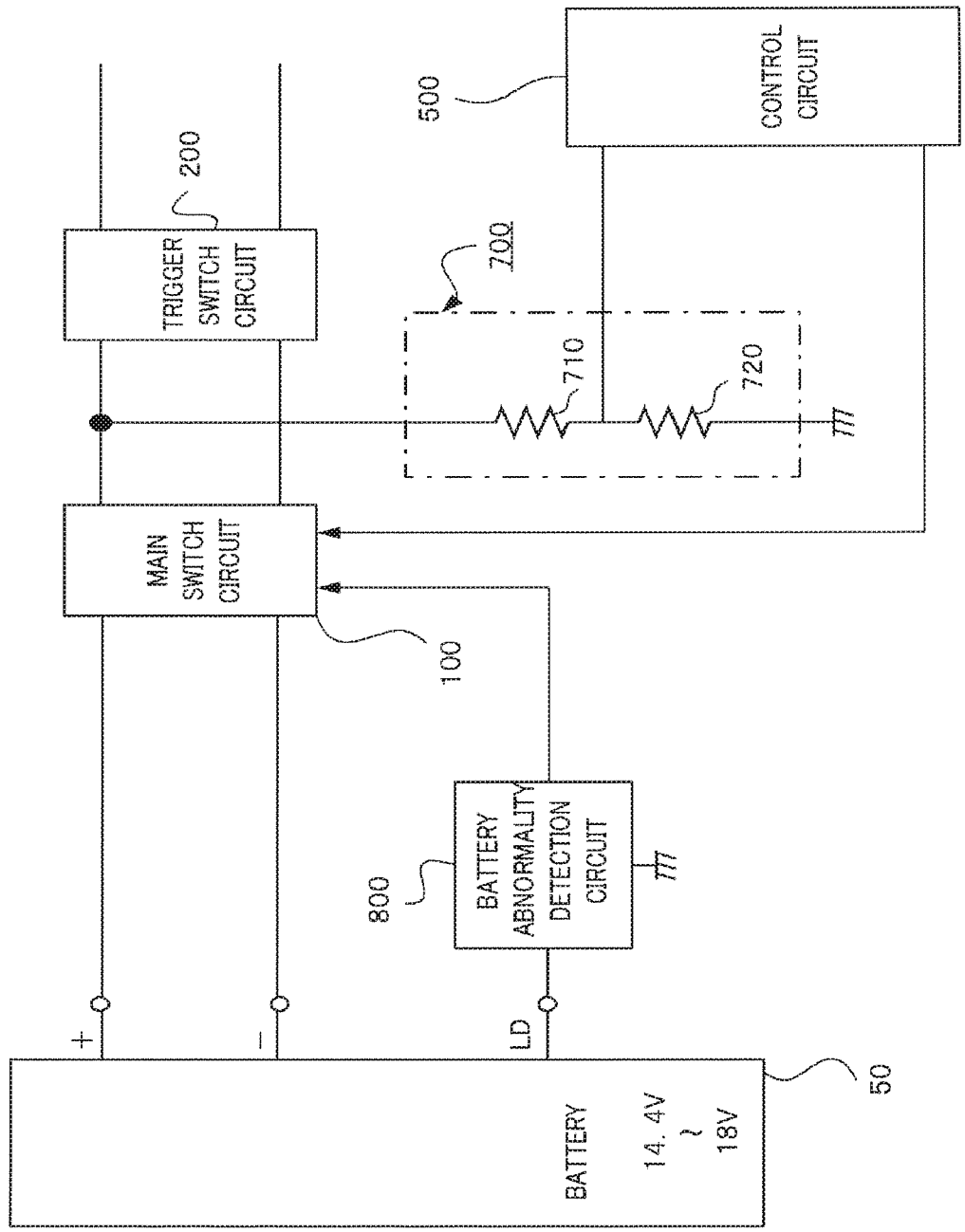

As shown in FIG. 12, the current detection circuit 600 consists of, for example, a current detection resistor 610, an operational amplifier 620, a grounding resistor 621, a feedback resistor 622, and a current limiting resistor 630.

The current detection resistor 610 connects the booster circuit 300, speed adjustment circuit 400, and drive part 30 and the ground. The terminal of the current detection resistor 610 that is not grounded is connected to the + terminal of the operational amplifier 620. The output of the operational amplifier 620 is connected to its own − (minus) terminal via the feedback resistor 622 and further grounded via the grounding resistor 621. Furthermore, the output of the operational amplifier 620 is supplied to the control circuit 500 via the current limiting resistor 630.

The current detection resistor 610 detects the total current running toward the booster circuit 300, speed adjustment circuit 400, and drive part 30. However, since the current running from the booster circuit 300 and speed adjustment circuit 400 to the ground is much smaller in quantity than the current running toward the drive part 30, the total current running toward the booster circuit 300, speed adjustment circuit 400, and drive part 30 is nearly equal in quantity to the current running toward the drive part 30.

The operational amplifier 620, grounding resistor 621, and feedback resistor 622 form a noninverting amplifying circuit. The + terminal of the operational terminal 620 serves as the noninverting input terminal (+) and the − terminal of the operational terminal 620 serves as the noninverting input terminal (−). The noninverting input terminal (+) of the operational terminal 620 receives the voltage between the current detection resistor 610 and ground. The noninverting input terminal (−) of the operational terminal 620 is grounded via the grounding resistor 621 and receives negative feedback on the output of the operational terminal 620 from the feedback resistor 622. The amplified output is limited in current by the current limiting resistor 630 and supplied to the control circuit 500.

Receiving a signal having a voltage equal to or higher than a threshold from the current detection circuit 600, the control circuit 500 mandatorily turns OFF the trigger switch circuit 200. Once the trigger switch circuit 200 is mandatorily turned OFF, the electric power supplied from the main switch circuit 100 is not supplied to the booster circuit 300 even if the trigger 13 is pulled. Here, the current detection resistor 610, grounding resistor 621, feedback resistor 622, and current limiting resistor 630 are selected so that the control circuit 500 receives a signal having a voltage equal to or higher than a threshold when the detected current exceeds a nearly rated value of the drive part 30 (for example, 15 A).

As described above, when the current running toward the drive part 30 is equal to or higher than a given value, the control circuit 500 mandatorily turns OFF the trigger switch circuit 200. However, even though the trigger switch circuit 200 is turned OFF, the main switch circuit 100 stays ON and the electric power is supplied to the constant voltage circuit 900.

As described above, when the current detection circuit 600 detects the current running toward the drive part 30 having an abnormal value, the control circuit 500 mandatorily turns OFF the trigger switch circuit 200 to stop the power supply to the drive part 30.

Furthermore, when the battery voltage detection circuit 700 detects the output voltage of the battery 50 being equal to or lower than a given value, the control circuit 500 mandatorily turns OFF the main switch circuit 100. The battery voltage detection circuit 700 consists of, for example, as shown in FIG. 13, a series circuit composed of voltage dividing resistors 710 and 720.

The voltage dividing resistor 710 is connected to the output of the main switch circuit 100 at one end and to one end of the voltage dividing resistor 720 at the other end. The other end of the voltage dividing resistor 720 is grounded.

The control circuit 500 receives the voltage applied to the voltage dividing resistor 720. When the received voltage becomes equal to or lower than a voltage at which the battery 50 starts overly discharging, the control circuit 500 mandatorily turns OFF the main switch circuit 100.

As described above, the battery voltage detection circuit 700 measures the voltage output from the main switch circuit 100 so as to measure the voltage output from the battery 50 and supplies it to the control circuit 500. When the output voltage of the battery 50 that is detected by the battery voltage detection circuit 700 has an abnormal value, the control circuit 500 mandatorily turns OFF the main switch circuit 100 to stop the output of the battery 50. In this way, overdischarge of the battery 50 is prevented.

Furthermore, when there is no voltage input from the current detection circuit 600 for more than a given period of time stored in the memory while there is voltage input from the battery voltage detection circuit 700, the control circuit 500 mandatorily and automatically turns OFF the main switch circuit 100. In this way, the electric lawn mower 1 is automatically powered off when it is left with the main switch circuit kept ON.

Furthermore, when the circuit provided on the substrate of the battery 50 detects any abnormal event with the battery cells, the battery abnormality detection circuit 800 automatically stops the power supply from the battery 50.

As described above, the present embodiment drives the motor of an electric lawn mower with fixed (stable) output regardless of the type and output of the power source. Furthermore, the power source is automatically turned off when the battery starts overly discharging, a current exceeding the rated value of the motor occurs, or the battery undergoes some abnormal event.

The present invention is not confined to the above embodiment and has various modifications and applications.

For example, in the above embodiment, the coupling part 20 is a cylindrical pipe. The coupling part 20 is not restricted in shape to the above-described embodiment as long as it has an electric wire inside for supplying electric power from the operation part 10 to the drive part 30. The coupling part 20 can be, for example, arc-shaped or made of a shape-changeable flexible material.

Furthermore, in the above embodiment, the remaining battery level display 14 is a liquid crystal screen. The remaining battery level display 14 is not necessarily a liquid crystal screen as long as the remaining battery level is known. For example, the voltage output from the battery 50 can be applied directly or via a voltage divider to a light emitting diode that widely changes brightness according to the applied voltage. In such a case, the brightness of the light emitting diode is proportional to the output of the battery 50. The brightness of the light emitting diode drops as the electric power of the battery 50 diminishes and the voltage drops. Checking on the brightness of the light emitting diode, the remaining level of the battery 50 can be known by the user.

Furthermore, in the above embodiment, the running indicator LED 40 indicates whether or not the drive part 30 is in operation. It is not necessarily a light emitter. For example, sound from the speaker 910 can be used to inform the operator. Alternatively, another speaker for announcing the operation can be provided.

Furthermore, in the above embodiment, the control circuit 500 controls the ON/OFF of the main switch circuit 100 and trigger switch circuit 200 upon overdischarge and overcurrent. It is not necessarily the control circuit 500 that is in charge of the control. For example, the following structure can be used when the current running toward the drive part 30 exceeds a given value. A GTO (gate turnoff thyristor) is series-connected between the battery 50 and drive part 30 and a Zener diode having a breakdown voltage nearly equal to the threshold voltage of this self-arc extinguishing element is connected to the gate of the GTO so that a voltage exceeding the breakdown voltage is applied to the Zener diode when a given value of current runs through the drive part 30. In this way, the current runs into the gate of the GTO and the GTO is turned OFF when the current running toward the drive part 30 exceeds a given value. After the GTO is turned OFF, the electric power output from the battery 50 is not supplied to the drive part 30.

Furthermore, in the above embodiment, the battery abnormality detection circuit 900 detects abnormal events of the battery 50 based on signals from the LD terminal of the battery 50. It is not necessary based on signals from the LD terminal. For example, the battery abnormality detection circuit 900 measures the temperature of the battery 50 and determines that the battery 50 is abnormal when the temperature exceeds a given temperature. Alternatively, the battery abnormality detection circuit 900 measures the resistance of the T terminal of the battery 50 and detects any abnormal event of the battery according to the resistance of the T terminal. Furthermore, the battery 50 is a lithium ion battery in the above explanation. The battery can be a lead rechargeable battery or nickel-cadmium battery or even other kinds of batteries as long as it has capability of supplying electric power to the power supply circuit 16. Here, when the battery 50 is a lithium ion battery, which is lighter than a nickel-cadmium battery or nickel-hydrogen battery, a lightweight coreless motor can be used as the motor provided at the other end of the coupling part 20 with a well-balanced manner; an overall lightweight, well-operable electric lawn mower 1 can be provided.

Furthermore, in the above embodiment, the control circuit 500 makes reference to a table stored in the internal memory to determine the discharging voltage of the battery 50 based on battery information supplied from the battery 50. This is not restrictive. For example, the discharging voltage can be determined from specific information contained in battery information. In such a case, the discharging voltage can be half the rated voltage of the battery 50 that is contained in battery information.

Furthermore, in the above embodiment, the operation part 10 and drive part 30 are provided on the coupling part 20 at a distance from each other. They are not necessarily provided at a distance or provided on the coupling part 20 as long as the electric power output from the operation part 10 is supplied to the drive part 30. For example, the operation part 10 and drive part 30 can be provided at one end of the coupling part 20 side by side or the operation part 10 and drive part 30 can be connected only by a conductive wire without the coupling part 20.

The electric lawn mower 1 can have a blade 39 provided at an angle with respect to the coupling part 20 as shown in FIG. 14. This allows the operator to maintain his/her natural posture during general operation of the electric lawn mower 1 in which the operator swings his/her hands holding the grip (grip part) 22 (not shown) and D-shaped handle 21 around his/her hip as indicated by the arrow O in FIG. 17. The electric lawn mower 1 shown in FIG. 14 is designed to have, for example, a total length A of approximately 180 cm and a blade inclination angle B of approximately 38 degrees with respect to the coupling part, whereby the blade 39 is nearly parallel to the ground surface when the distance C between the grip 22 and ground surface is 70 to 90 cm, which is slightly above the hip of the operator. Additionally, the D-shaped handle 21 can be attached by the operator at any point on the coupling part 20. The distance E between the D-shaped handle 21 and grip 22, namely the distance between the trigger 13 to which the operator applies a force and the holding part of the D-shaped handle 21, is designed to be nearly equal to the shoulder width of the operator, for example, at least 20 cm and desirably 30 cm, whereby the operator can perform the operation in his/her natural posture.

Figure 15:
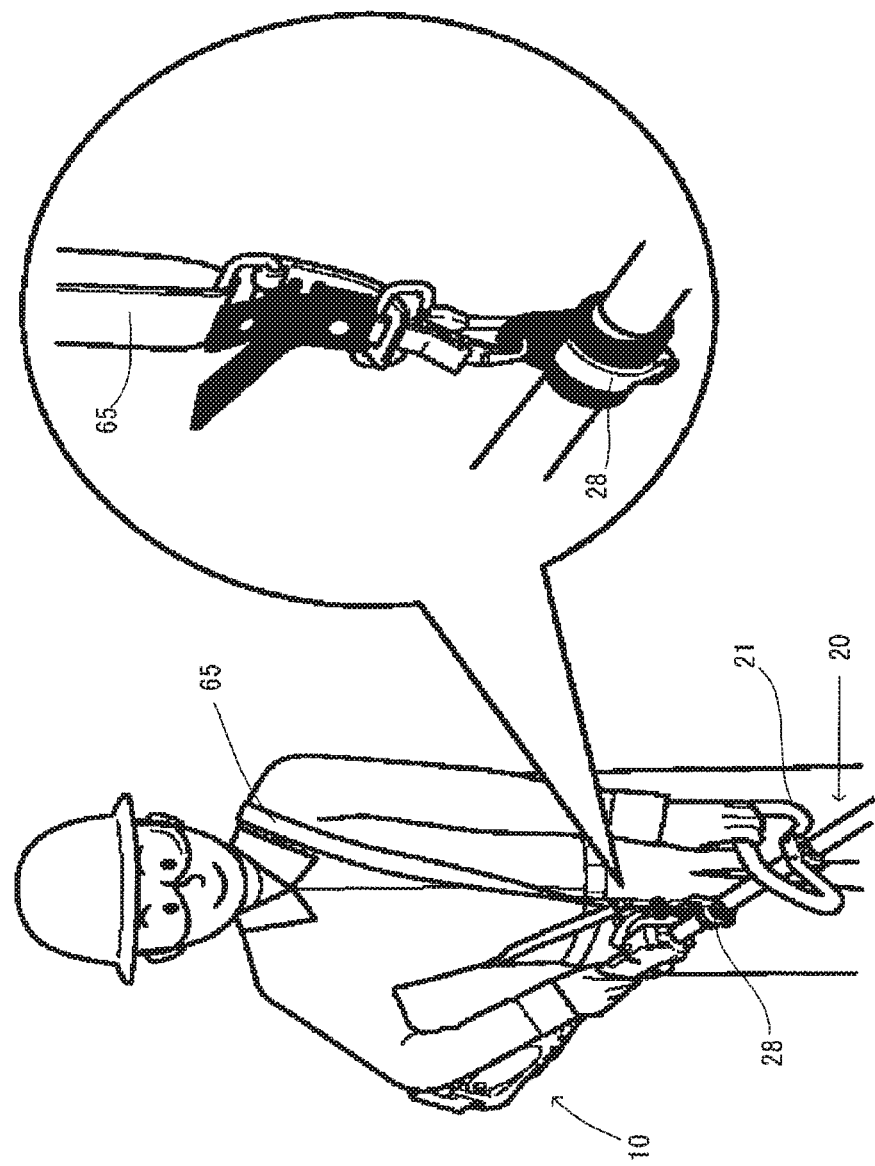
Figure 16:
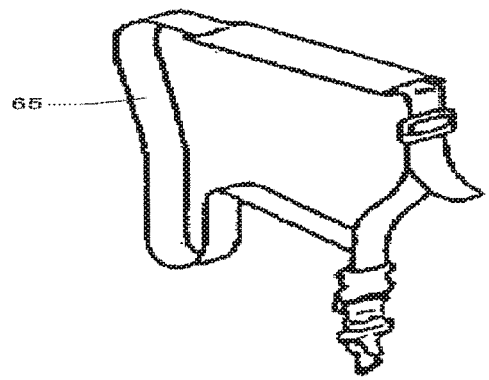
Figure 17:
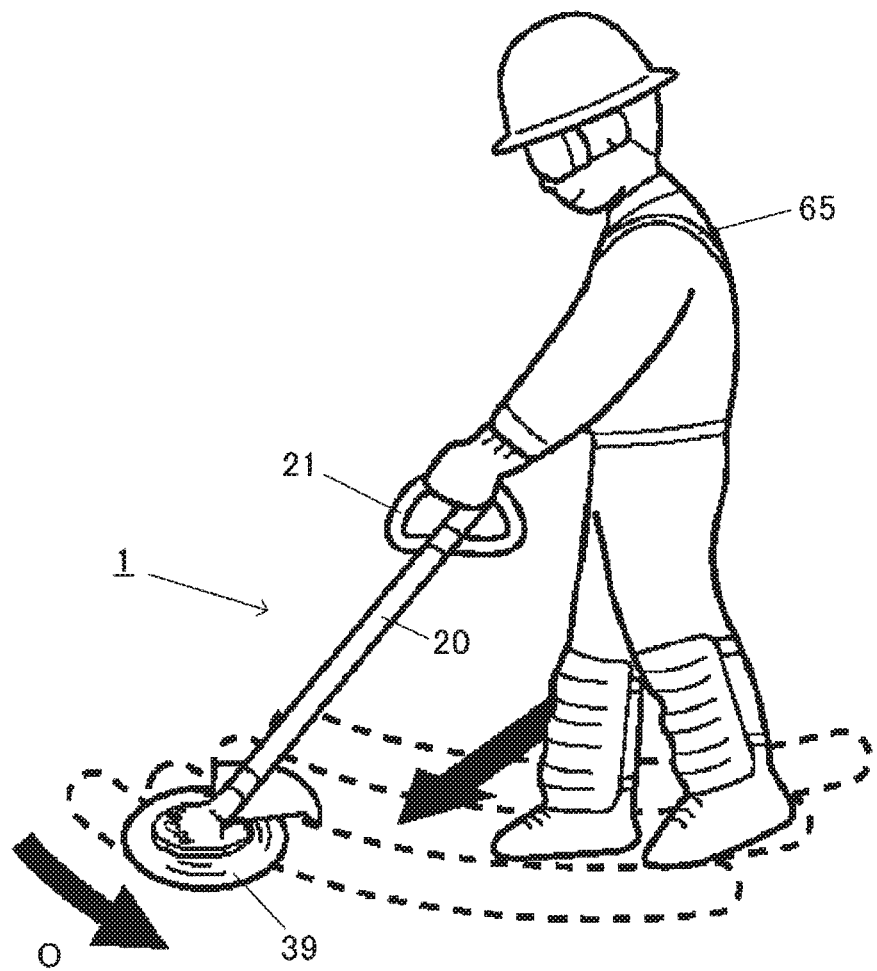

A belt holder 28 holding a belt 65 that can be placed over a shoulder of the operator as shown in FIGS. 15 and 16 is provided between the D-shaped handle 21 and grip 22. As shown in FIGS. 15 and 17, the belt 65 is engaged with the belt holder 28 and then the belt 65 is placed over a shoulder of the operator. The weight of the electric lawn mower 1 is received by the shoulder during the operation, less tiring the operator.

Furthermore, a 14.4 V or 18 V lithium ion (Li-ion) battery (lithium rechargeable battery) or nickel-cadmium (Ni—Cd) battery having a common mounting part can be mounted on the operation part 10 of the electric lawn mower 1. Incidentally, a 14.4 V lithium battery includes, for example, eight lithium ion battery cells comprising, four battery cells connected in series while parallelly connected with other four, connected in series, of the eight battery cells and has a weight of approximately 550 g and a capacity of 3.0 Ah, or a 14.4 V lithium battery includes, for example, four series-connected lithium ion battery cells and has a weight of approximately 300 g and a capacity of 1.5 Ah. A 18 V lithium ion battery includes, for example, ten lithium ion battery cells comprising, five battery cells connected in series, while connected to other five, of the ten battery cells connected in series, and has a weight of approximately 700 g and a capacity of 3.0 Ah, or a 18 V lithium ion battery includes, for example, five series-connected lithium ion battery cells and has a weight of approximately 400 g and a capacity of 1.5 Ah. A 14.4 V nickel-cadmium battery includes, for example, 12 series-connected nickel-cadmium battery cells and has a weight of approximately 800 g and a capacity of 3.0 Ah. A 18 V nickel-cadmium battery includes, for example, 15 series-connected nickel-cadmium battery cells and has a weight of approximately 1000 g and a capacity of 3.0 Ah.

The drive part 30 of the electric lawn mower 1 is relatively lightweight because of no gear or core. The motor case 29 is formed by molding aluminum alloy. The summed weight of the drive part 30 and the blade 39 is, for example, approximately 1500 g. Therefore, as shown in FIG. 14, the gravity center G1 of the electric lawn mower 1 when a 18 V nickel-cadmium battery is mounted on the operation part 10, the gravity center G2 when a 18 V lithium ion battery having a capacity 3.0 Ah is mounted, the gravity center G3 when a 14.4 V lithium ion battery having a capacity 3.0 Ah is mounted, and the gravity center G4 when a 14.4 V lithium ion battery having a capacity of 1.5 Ah is mounted are all on the drive part 30 side with respect to the D-shaped handle 21. In other words, the gravity center of the electric lawn mower 1 is always on the drive part 30 side with respect to the D-shaped handle 21 with any battery mentioned above being mounted on the operation part 10.

If the gravity center is located on the operation part 10 side with respect to the D-shaped handle 21, the operator has to horizontally swing the D-shaped handle 21 while lifting it. However, here, the gravity center of the electric lawn mower 1 is located on the drive part 30 side with respect to the D-shaped handle 21, whereby the electric lawn mower 1 automatically lowers the coreless motor to the ground while the operator holds the electric lawn mower 1 by holding the grip 22 and D-shaped handle 21. The operator does not need to apply a force to lower the forefront of the electric lawn mower 1 during the operation, which reduces the operator's workload and improves the operability. The belt holder 28 between the D-shaped handle 21 and grip 22 allows the coreless motor to automatically fall to the ground when the belt 65 is placed over the shoulder, giving excellent operability. With the belt 65 being placed over the shoulder, the operator can hold the grip 22 in the rear of the belt holder 28 and applies to the grip 22 a force toward the ground. In this way, the electric lawn mower 1 is supported by the belt holder 28 and grip 22. The electric lawn mower 1 can be swung about the belt holder 28 simply by applying to the D-shaped handle 21 a force in the swing direction. The blade 39 can easily be moved to the target site, improving the operability.

In the above embodiment, the motor case 29 is made of aluminum alloy. The motor case 29 can be made of resin and a weight can be provided near the drive part 30 to have the gravity center on the drive part 30 side with respect to the D-shaped handle 21. However, the motor case 29 made of aluminum alloy provides better cooling action, which curbs rise in the temperature of the coil substrate 31, and increases the strength, which improves the life.

Furthermore, the blade 39 of the electric lawn mower 1 is directly driven by the central shaft 32 of the coreless motor, namely the blade 39 is directly connected to the coreless motor without any gear or the like, curbing mechanical loss. Furthermore, no gear noise occurs, curbing unwanted noise. Furthermore, the coreless motor rotates as a magnetic flux passing through the coil substrate 31 in the axial direction of the central shaft 32 occurs. Therefore, the motor does not protrude in the axial direction of the central shaft 32 even though the motor is provided where the drive part 30 side is (where the blade 39 side is). The drive part 30 can significantly be downsized in the axial direction of the central shaft 32. Therefore, any reduction in the operability due to the protrusion of the drive part 30 in the axial direction of the central shaft 32 is curbed.

The coreless motor in the above embodiment is a coreless motor having a coil substrate 31 in the rotor part and a brush 33 with a magnet part 37 in the stator part. It can be a brushless-type coreless motor comprising a coil substrate in the stator part and a magnet in the rotor part.

Furthermore, in the above embodiment, the gravity center is located on the coreless motor side with respect to the D-shaped handle 21 regardless of any battery, 14.4 V or 18 V lithium ion battery or nickel-cadmium rechargeable battery, being mounted. However, from the viewpoint of providing an electric lawn mower that is overall lightweight, well-balanced, quiet, and operable for a prolonged time, the structure allowing only lithium ion batteries to be mounted may be used.

Furthermore, in the above embodiment, an electric operating machine applied to an electric lawn mower using an electric motor is described. The present invention is applicable to any electric machine and similarly applicable to a wide range of other operating machines using an electric motor. Particularly, the present invention is suitable for sanders, polishers, routers, and dust collectors in which the rotation of an electric motor is directly transferred to the work tool (rotary blade, fan, etc.) via no reduction gears.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Applications JP2009-199066 filed Aug. 28, 2009, JP2009-229092 filed Sep. 30, 2009 and JP2010-006186 filed Jan. 14, 2010, the entire disclosure of which is incorporated by reference herein.

REFERENCE SIGNS LIST 1 electric lawn mower
10 operation part
11 battery mounting part
12 main switch
13 trigger
14 remaining battery level display
15 main LED
16 power supply circuit
20 coupling part
21 D-shaped handle
22 grip
23 U-shaped handle
24 wire
25 rotation shaft
26 variable speed switch
27 resin cover
30 drive part
40 running indicator LED
50 battery
100 main switch circuit
200 trigger switch circuit
300 booster circuit
400 speed adjustment circuit
500 control circuit
600 current detection circuit
700 battery voltage detection circuit
800 battery abnormality detection circuit
900 constant voltage circuit
910 speaker
920 sound reproducing circuit
930 radio

The invention claimed is:

1. An electric operating machine comprising:
a battery mount mounting/dismounting a battery;
an electric motor that is driven by electric power supplied from the battery;
a trigger that allows or blocks the electric power supply to the electric motor from the battery based on a user input;
a control circuit that blocks the electric power supply to the electric motor from the battery based on detecting an abnormal condition in the battery; and
a switch circuit that receives a signal from the control circuit, the switch circuit allowing or blocking the electric power supply to the electric motor based on the received signal,
wherein the control circuit identifies a type of the battery mounted on the battery mount, and uses a value based on the identified type of the battery as a threshold value for determining that the battery is in the abnormal condition,
wherein, when the identified type is a first type, the control circuit sets a first threshold value for determining that the battery is in the abnormal condition, and when the identified type is a second type that is different from the first type, the control circuit sets a second threshold value that is different from the first threshold value for determining that the battery is in the abnormal condition, and
wherein when the abnormal condition is detected, the control circuit transmits the signal to the switch circuit such that the switch circuit blocks the electric power supply to the electric motor from the battery based on the signal even when the trigger allows the electric power supply to the electric motor from the battery based on the user input.

2. The electric operating machine according to claim 1 wherein the control circuit (i) sets a set voltage preventing an over discharge of the battery as the threshold value; and (ii) blocks the output from the battery when the voltage output from the battery becomes equal or lower than the set voltage.

3. The electric operating machine according to claim 2, wherein the battery mount is capable of mounting/dismounting any one of batteries having different rated voltages,
the electric motor is capable of being driven by any one of the batteries, and
the control circuit identifies the rated voltage of the battery mounted on the battery mount, and uses a value based on the identified rated voltage as the set voltage.

4. The electric operating machine according to claim 3, wherein the control circuit (i) sets a first voltage as the set voltage when the battery mounted on the battery mount has a first rated voltage or (ii) sets a second voltage higher than the first voltage when the battery mounted on the battery mount has a second rated voltage higher than the first rated voltage.

5. The electric operating machine according to claim 3 comprising a voltage converter converting the voltage input from the battery and outputting the converted voltage to the electric motor.

6. The electric operating machine according to claim 5 wherein the voltage converter transforms the voltage input from the battery and outputs the transformed voltage to the electric motor.

7. The electric operating machine according to claim 1 wherein the battery comprises a protection circuit (i) detecting an abnormal event of the battery, and (ii) causing the battery to stop outputting the current based on detecting the abnormal event of the battery independent from the determination by the control circuit.

8. The electric operating machine according to claim 7, wherein,
when the abnormal event of the battery are detected by the protection circuit, the battery outputs an abnormal signal to the control circuit, and
the control circuit blocks the output from the battery based on the abnormal signal.

9. The electric operating machine according to claim 1, wherein the control circuit identifies the type of the battery mounted on the battery mount based on battery information output by the battery.

10. The electric operating machine according to claim 8, wherein the control circuit sets the set voltage in reference to a preliminarily stored relationship between battery information and the set voltage.

11. The electric operating machine according to claim 1, comprising an abnormal condition informer informing a worker that the output of the battery is stopped due to the abnormal condition, when the control circuit blocks the output from the battery based on determining that the battery is in the abnormal condition.

12. The electric operating machine according to claim 1, wherein the control circuit blocks a current running through the electric motor when the current running through the electric motor exceeds a given amount.

13. The electric operating machine according to claim 1, wherein the battery is a lithium ion battery.

* * * * *